United States Patent
Chen

(10) Patent No.: US 12,041,026 B2
(45) Date of Patent: Jul. 16, 2024

(54) REVERSE ADDRESS RESOLUTION METHOD AND ELECTRONIC DEVICE

(71) Applicant: HUAWEI TECHNOLOGIES CO., LTD., Shenzhen (CN)

(72) Inventor: Gang Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/927,413

(22) PCT Filed: May 29, 2021

(86) PCT No.: PCT/CN2021/097046
§ 371 (c)(1),
(2) Date: Nov. 23, 2022

(87) PCT Pub. No.: WO2021/244456
PCT Pub. Date: Dec. 9, 2021

(65) Prior Publication Data
US 2023/0198934 A1   Jun. 22, 2023

(30) Foreign Application Priority Data

May 30, 2020   (CN) .......................... 202010480311.8

(51) Int. Cl.
*H04L 61/103* (2022.01)
*H04L 101/622* (2022.01)

(52) U.S. Cl.
CPC ...... *H04L 61/103* (2013.01); *H04L 2101/622* (2022.05)

(58) Field of Classification Search
CPC .......................... H04L 2101/622; H04L 61/103
(Continued)

(56) References Cited

U.S. PATENT DOCUMENTS 5,526,489 A    6/1996  Nilakantan et al.
6,292,900 B1 * 9/2001  Ngo ...................... H04L 63/105
                                                                 726/1
(Continued)

FOREIGN PATENT DOCUMENTS

CN    1466320 A        1/2004
CN    1925493 A   *    3/2007
(Continued)

OTHER PUBLICATIONS

Google English translation of CN-105682182-A, pp. 1-21, Jun. 2016 (Year: 2016).*
(Continued)

*Primary Examiner* — David P Zarka
(74) *Attorney, Agent, or Firm* — HUAWEI TECHNOLOGIES CO., LTD.

(57) ABSTRACT

In a reverse address resolution method, a sender electronic device broadcasts a first request packet. An Ethernet payload of the first request packet includes a media access control (MAC) address of a target electronic device. After receiving the first request packet, the target electronic device determines that an IP address of the target electronic device is requested, and returns a first reply packet. An Ethernet payload of the first reply packet includes the internet protocol (IP) address of the target electronic device. According to the technical solutions provided in this application, the sender electronic device obtains the IP address of the target electronic device based on the MAC address of the target electronic device through interaction at a data link layer. Therefore, in a mobile distributed system, the IP address of the target electronic device is quickly obtained without relying on a server.

6 Claims, 20 Drawing Sheets

(58) Field of Classification Search
USPC .......................................................... 709/245
See application file for complete search history.

(56) References Cited

U.S. PATENT DOCUMENTS

| | | | | |
|---|---|---|---|---|
| 6,697,360 | B1* | 2/2004 | Gai .................... | H04L 61/5014 370/389 |
| 6,880,019 | B1* | 4/2005 | Toyoda .............. | H04N 1/00214 709/200 |
| 9,641,433 | B2* | 5/2017 | Sun ....................... | H04L 12/462 |
| 9,641,916 | B2* | 5/2017 | Chen .................. | H04Q 11/0062 |
| 10,097,505 | B2* | 10/2018 | Guo ...................... | H04W 8/005 |
| 2005/0053006 | A1* | 3/2005 | Hongal .................. | H04L 12/46 370/389 |
| 2005/0122976 | A1 | 6/2005 | Poli et al. | |
| 2005/0180439 | A1* | 8/2005 | Kondo .................... | H04L 61/10 370/395.54 |
| 2007/0248085 | A1 | 10/2007 | Volpano | |
| 2010/0011203 | A1 | 1/2010 | Dickens et al. | |
| 2017/0041230 | A1* | 2/2017 | Huang .................... | H04L 69/22 |
| 2018/0077047 | A1* | 3/2018 | Srinivasan .............. | H04L 45/66 |
| 2018/0081565 | A1* | 3/2018 | Tan ........................ | G06F 3/0656 |
| 2019/0319914 | A1* | 10/2019 | Petersen ............... | H04L 61/103 |
| 2021/0135903 | A1* | 5/2021 | Natarajan ............... | H04L 45/02 |

FOREIGN PATENT DOCUMENTS

| | | | | | |
|---|---|---|---|---|---|
| CN | 1980193 | A | | 6/2007 | |
| CN | 102065125 | A | | 5/2011 | |
| CN | 103327130 | A | * | 9/2013 | |
| CN | 103327130 | A | | 9/2013 | |
| CN | 103812957 | A | | 5/2014 | |
| CN | 104038553 | A | | 9/2014 | |
| CN | 105007260 | A | | 10/2015 | |
| CN | 105656680 | A | * | 6/2016 | ............ H04L 41/12 |
| CN | 105682182 | A | * | 6/2016 | |
| CN | 105682182 | A | | 6/2016 | |
| CN | 106412142 | A | | 2/2017 | |

OTHER PUBLICATIONS

Google English translation of CN-1925493-A, pp. 1-9, Jun. 2007 (Year: 2007).*
Sandra G. Dykes et al, A Non-Broadcast Address Resolution Protocol for SpaceWire Networks, 2006 IEEE, 9 pages.
Wang Shao bu et al, The Transformation of Network Address and the Division of Subnet, 2004, with the English Abstract, 2 pages.
Finlayson et al., A Reverse Address Resolution Protocol, Network Working Group, Request for Comments: 903, Jun. 1984, 4 pages.
Contra Transwitch Corporation A: "Extensions to IPv6 Discovery for Inverse Discovery Specification; rfc3122.txt", IETF Standard, Jun. 1, 2001, XP015008903, Network Working Group 21 pages.
Kishore Aseem: "Determine IP Address From a MAC Address", PrintWhatYouLike on Determine IP Address From a MAC Address, Aug. 22, 2010, XP093065873, 3 pages.
R. Woundy et al., Dynamic Host Configuration Protocol (DHCP) Leasequery, Network Working Group, Request for Comments: 4388, Feb. 2006, RFC 4388, 27 pages.
Finlayson, Mann, Mogul, Theimer, A Reverse Address Resolution Protocol, rfc 903, Jun. 1984, 4 pages.
Xiong wei, An ARP Aging Mechanism for Industrial Ethernet Switch, May 2020 ,4 pages.
Hu Liang et al, Network program design, Sep. 2003, 1 page (abstract).

* cited by examiner

Mobile distributed system

| OSI seven-layer reference model | TCP/IP four-layer conceptual model |
|---|---|
| Application layer | Application layer |
| Presentation layer | |
| Session layer | |
| Transport layer | Transport layer |
| Network layer | Network layer |
| Data link layer | Data link layer |
| Physical layer | |

REVERSE ADDRESS RESOLUTION METHOD AND ELECTRONIC DEVICE

CROSS-REFERENCE TO RELATED ART

This application is a national stage of International Application No. PCT/CN2021/097046, filed on May 29, 2021, which claims priority to Chinese Patent Application No. 202010480311.8, filed on May 30, 2020. Both of the aforementioned applications are hereby incorporated by reference in their entireties.

TECHNICAL FIELD

This application relates to the field of terminal and communications technologies, and in particular, to a reverse address resolution method and an electronic device.

BACKGROUND

As shown in FIG. 1, a mobile distributed system is an asynchronous network system of a peer-to-peer structure formed by electronic devices. It is required that in any local area network, the electronic devices can quickly find each other, and data synchronization between all member devices can be completed. Because the electronic devices in the mobile distributed system communicate with each other over a local area network based on a transmission control protocol/internet protocol (transmission control protocol/internet protocol, TCP/IP) protocol stack, a member device needs to know an IP address of a peer device during communication.

Currently, in a mobile distributed system in a local area network, if an electronic device A wants to know an IP address of an electronic device B, the electronic device A usually needs to interact with the electronic device B for a plurality of times at an application layer to obtain the IP address. For example, the electronic device A searches for and obtains the IP address by accessing a server of an application jointly run by the electronic device A and the electronic device B.

However, the electronic device B in the mobile distributed system may move to various locations at any time. After the electronic device B leaves and then accesses the local area network, an IP address applied for by the electronic device B may change. If the electronic device A frequently obtains a latest IP address of the electronic device B from the server by using the application layer, extremely high signaling overheads are caused. In addition, the server of the application is not always stable. If the sewer is faulty, the electronic device A cannot obtain the IP address of the electronic device B. As a result, the electronic device A cannot normally communicate with the electronic device B.

SUMMARY

This application provides a reverse address resolution method and an electronic device. In a mobile distributed system, an IP address of a target electronic device is quickly obtained without relying on a sewer.

According to a first aspect, an embodiment of this application provides a reverse address resolution method. The method includes: A sender electronic device broadcasts a first request packet in a network, where an Ethernet payload of the first request packet includes a MAC address of a target electronic device. The sender electronic device receives a first reply packet returned by the target electronic device, where an Ethernet payload of the first reply packet includes an IP address of the target electronic device. The sender electronic device obtains the IP address of the target electronic device from the first reply packet.

In this embodiment of this application, the sender electronic device may receive, by broadcasting the first request packet carrying the MAC address of the target electronic device, the first reply packet that is returned by the target electronic device and that includes the IP address of the target electronic device, to obtain the IP address of the target electronic device. The MAC address of the target electronic device is included in the Ethernet payload of the sent first request packet, to obtain the first reply packet whose Ethernet payload includes the IP address of the target electronic device. This operation can be performed at a data link layer without a plurality of interactions at an application layer. Therefore, in a mobile distributed system, the IP address of the target electronic device is quickly obtained without relying on a sewer.

For the first request packet and the first reply packet:

Optionally, with reference to the first aspect, in some embodiments, an Ethernet header or the Ethernet payload of the first request packet carries a request identifier, and the request identifier is used to indicate that the first request packet is used to request the IP address of the target electronic device based on the MAC address of the target electronic device.

In this embodiment of this application, by using the request identifier carried in the first request packet, an electronic device that receives the first request packet may determine that the first request packet is used to request the IP address of the target electronic device based on the MAC address of the target electronic device.

Optionally, with reference to some embodiments of the first aspect, in some embodiments, an Ethernet header or the Ethernet payload of the first reply packet carries a reply identifier, and the reply identifier is used to indicate that the first reply packet is used to reply to the first request packet.

In this embodiment of this application, by using the reply identifier carried in the first reply packet, the sender electronic device may determine, after receiving the first reply packet, that the first reply packet is used to reply to the first request packet.

Optionally, with reference to some embodiments of the first aspect, in some embodiments, the first request packet and the first reply packet are data frames at the data link layer, the Ethernet header of the first request packet includes an Ethernet broadcast address, and the Ethernet header of the first reply packet includes a MAC address of the sender electronic device.

Optionally, with reference to some embodiments of the first aspect, in some embodiments, the Ethernet payload of the first request packet further includes an IP address and the MAC address of the sender electronic device, and the Ethernet payload of the first reply packet further includes the MAC address of the target electronic device.

In this embodiment of this application, the Ethernet payload of the first request packet further includes the IP address and the MAC address of the sender electronic device, so that the target electronic device can determine a destination to which the first reply packet is returned. The Ethernet payload of the first reply packet further includes the MAC address of the target electronic device, so that after receiving the first reply packet, the sender electronic device can determine that the received first reply packet is from a correct target electronic device.

With reference to some embodiments of the first aspect, in some embodiments, after the step in which the sender electronic device obtains the IP address of the target electronic device from the first reply packet, the method further includes: The sender electronic device stores the IP address of the target electronic device.

In this embodiment of this application, the sender electronic device may store the obtained IP address of the target electronic device for subsequent use.

With reference to some embodiments of the first aspect, in some embodiments, before the step in which a sender electronic device broadcasts a first request packet in a network, the method further includes: The sender electronic device invokes a distributed reverse address resolution protocol interface to request to obtain the IP address of the target electronic device. The sender electronic device constructs the first request packet in response to the request of the sender electronic device for invoking the distributed reverse address resolution protocol interface to obtain the IP address of the target electronic device.

In this embodiment of this application, the sender electronic device may invoke the distributed reverse address resolution protocol interface based on the application layer to request to obtain the IP address of the target electronic device, so as to construct the first request packet and perform a subsequent step of obtaining the IP address of the target electronic device at the data link layer. The IP address of the target electronic device can be obtained without a plurality of interactions at the application layer or depending on a sewer of an application. This simplifies a process of obtaining the IP address of the target electronic device, and reduces overheads of obtaining the IP address of the target electronic device.

With reference to some embodiments of the first aspect, in some embodiments, the request for invoking the distributed reverse address resolution protocol interface to obtain the IP address of the target electronic device carries the MAC address of the target electronic device.

In this embodiment of this application, the MAC address of the target electronic device is directly carried when the distributed reverse address resolution protocol interface is invoked. Because the MAC address is unique, a process of determining the target electronic device whose IP address is to be obtained is simplified.

With reference to some embodiments of the first aspect, in some embodiments, the request for invoking the distributed reverse address resolution protocol interface to obtain the IP address of the target electronic device carries a device identifier of the target electronic device other than the MAC address of the target electronic device, and the device identifier is used to uniquely identify the target electronic device in the sender electronic device. Before the step in which the sender electronic device constructs the first request packet, the method further includes: The sender electronic device determines the MAC address of the target electronic device based on the device identifier of the target electronic device.

In this embodiment of this application, the device identifier other than the MAC address is carried when the distributed reverse address resolution protocol interface is invoked. Before the first request packet is constructed, the MAC address of the target electronic device is determined based on the device identifier. When invoking the distributed reverse address resolution protocol interface, the application layer only needs to use a commonly used device identifier at the application layer, and does not need to first find a MAC address corresponding to the device identifier. This reduces processing processes that need to be performed by the application layer, and has good compatibility with an existing protocol process.

With reference to some embodiments of the first aspect, in some embodiments, before the step in which the sender electronic device invokes a distributed reverse address resolution protocol interface to request to obtain the IP address of the target electronic device, the method further includes: The sender electronic device establishes a communication connection to the target electronic device by using a recorded IP address, where the recorded IP address is an IP address that is of the target electronic device and that is recorded by the sender electronic device when the sender electronic device establishes a communication connection to the target electronic device last time. When failing to resolve the recorded IP address, the sender electronic device performs the step in which the sender electronic device invokes a distributed reverse address resolution protocol interface to request to obtain the IP address of the target electronic device.

In this embodiment of this application, before invoking the distributed reverse address resolution protocol interface to obtain the IP address of the target electronic device at the data link layer, the sender electronic device may first attempt to establish the communication connection to the target electronic device by using the recorded IP address. The distributed reverse address resolution protocol interface is invoked only after the recorded IP address fails to be resolved. This improves compatibility with an existing protocol processing process.

With reference to some embodiments of the first aspect, in some embodiments, the sender electronic device performs address resolution on the recorded IP address to obtain a MAC address corresponding to the recorded IP address. When the sender electronic device cannot obtain the MAC address corresponding to the recorded IP address, or the obtained MAC address corresponding to the recorded IP address is different from the MAC address of the target electronic device, the sender electronic device determines that resolution of the recorded IP address fails.

With reference to some embodiments of the first aspect, in some embodiments, after the step in which the sender electronic device invokes a distributed reverse address resolution protocol interface to request to obtain the IP address of the target electronic device, and before the step in which the sender electronic device constructs the first request packet, the method further includes: The sender electronic device searches a local distributed reverse address resolution protocol entry, to determine whether an unaged mapping entry including the IP address of the target electronic device exists, where the local distributed reverse address resolution protocol entry includes a mapping entry between a MAC address and an IP address of an electronic device that has established a communication connection to the sender electronic device, an aged mapping entry is invalid, and an unaged mapping entry is valid. When determining that the local distributed reverse address resolution protocol entry does not include an unaged mapping entry including the IP address of the target electronic device, the sender electronic device performs the step in which the sender electronic device constructs the first request packet.

In this embodiment of this application, after invoking the distributed reverse address resolution protocol interface, and before constructing the first request packet at the data link layer, the sender electronic device may further first search the local distributed reverse address resolution protocol entry for an unaged mapping entry including the IP address of the target electronic device. If no unaged mapping entry including the IP address of the target electronic device exists, the sender electronic device constructs the first request packet to perform a subsequent process of obtaining the IP address at the data link layer. Otherwise, the sender electronic device may directly obtain the IP address of the target electronic device from the local distributed reverse address resolution protocol entry, to simplify an interaction process of obtaining the IP address of the target electronic device, and reduce signaling overheads.

With reference to some embodiments of the first aspect, in some embodiments, the sender electronic device periodically performs heartbeat detection on a mapping entry in the local distributed reverse address resolution protocol entry, where the heartbeat detection is used to determine that a communication connection can be successfully established, by using an IP address in the mapping entry, to an electronic device to which a corresponding MAC address in the mapping entry belongs. When heartbeat detection on a mapping entry fails for a preset quantity of consecutive detections, the sender electronic device sets the mapping entry to aged.

In this embodiment of this application, the sender electronic device periodically performs heartbeat detection on a mapping entry in the local distributed reverse address resolution protocol entry, to ensure that an aging state of the mapping entry is true and valid.

With reference to some embodiments of the first aspect, in some embodiments, the sender electronic device and the target electronic device are located in different local area networks connected to a gateway server. That the sender electronic device receives a first reply packet returned by the target electronic device specifically includes: The sender device receives the first reply packet that is returned by the target electronic device and forwarded by the gateway server as a proxy.

With reference to some embodiments of the first aspect, in some embodiments, the Ethernet headers or the Ethernet payloads of the first request packet and the first reply packet carry a proxy forwarding identifier, and the proxy forwarding identifier is used to request the gateway sewer to forward, as a proxy, the first request packet or the first reply packet.

In the foregoing embodiment, the sender electronic device and the target electronic device are located in different local area networks, and the first request packet and the first reply packet may be forwarded by the gateway server as a proxy, to obtain an IP address across local area networks.

In some embodiments of this application, the MAC address of the target electronic device that is included in the Ethernet payload of the first request packet may be one, more, or null.

Optionally, with reference to some embodiments of the first aspect, in some embodiments, the MAC address of the target electronic device that is included in the Ethernet payload of the first request packet is a MAC address of one electronic device, and the request identifier is a first value in a preset field.

Optionally, with reference to some embodiments of the first aspect, in some embodiments, the MAC address of the target electronic device that is carried in the Ethernet payload of the first request packet is MAC addresses of a plurality of electronic devices, and the request identifier is a second value in the preset field.

Optionally, with reference to some embodiments of the first aspect, in some embodiments, the first request packet is used to request IP addresses of all electronic devices in a local area network, the MAC address of the target electronic device that is carried in the Ethernet payload of the first request packet is null or an Ethernet broadcast address, and the request identifier is a third value in the preset field.

In the foregoing embodiments, the first value, the second value, and the third value are different from each other.

Optionally, with reference to some embodiments of the first aspect, in some embodiments, the method further includes: When the sender electronic device receives the first reply packet returned by the target electronic device, the sender electronic device refreshes a recorded online status of the target electronic device to online, where the online status of the target electronic device being online indicates that the target electronic device is in a state in which a communication connection to the target electronic device can be established.

In this embodiment of this application, the recorded online status of the target electronic device is refreshed by determining that the target electronic device that returns the first reply packet is online. Therefore, the distributed reverse address resolution protocol interface may further provide a function of determining an online status of another electronic device in a local area network.

According to a second aspect, an embodiment of this application provides a reverse address resolution method. The method includes: A target electronic device receives a first request packet broadcast by a sender electronic device, where an Ethernet payload of the first request packet includes a MAC address of the target electronic device. The target electronic device determines that the first request packet is used to request an IP address of the target electronic device. The target electronic device returns a first reply packet to the sender electronic device, where an Ethernet payload of the first reply packet includes the IP address of the target electronic device.

In this embodiment of this application, after receiving the first request packet that is broadcast by the sender electronic device and whose Ethernet payload includes the MAC address of the target electronic device, the target electronic device returns the first reply packet whose Ethernet payload includes the IP address of the target electronic device to the sender electronic device. This operation can be performed at a data link layer without a plurality of interactions at an application layer. Therefore, in a mobile distributed system, the IP address of the target electronic device is quickly obtained without relying on a sewer.

For the first request packet and the first reply packet:

Optionally, with reference to the second aspect, in some embodiments, an Ethernet header or the Ethernet payload of the first request packet carries a request identifier, and the request identifier is used to indicate that the first request packet is used to request the IP address of the target electronic device based on the MAC address of the target electronic device.

In this embodiment of this application, by using the request identifier carried in the first request packet, the target electronic device may determine that the first request packet is used to request the IP address of the target electronic device based on the MAC address of the target electronic device.

Optionally, with reference to some embodiments of the second aspect, in some embodiments, an Ethernet header or the Ethernet payload of the first reply packet carries a reply identifier, and the reply identifier is used to indicate that the first reply packet is used to reply to the first request packet.

In this embodiment of this application, by using the reply identifier carried in the first reply packet, the sender electronic device may determine, after receiving the first reply packet, that the first reply packet is used to reply to the first request packet.

Optionally, with reference to some embodiments of the second aspect, in some embodiments, the first request packet and the first reply packet are data frames at the data link layer, the Ethernet header of the first request packet includes an Ethernet broadcast address, and the Ethernet header of the first reply packet includes a MAC address of the sender electronic device.

Optionally, with reference to some embodiments of the second aspect, in some embodiments, the Ethernet payload of the first request packet further includes an IP address and the MAC address of the sender electronic device, and the Ethernet payload of the first reply packet further includes the MAC address of the target electronic device.

In this embodiment of this application, the Ethernet payload of the first request packet further includes the IP address and the MAC address of the sender electronic device, so that the target electronic device can determine a destination to which the first reply packet is returned. The Ethernet payload of the first reply packet further includes the MAC address of the target electronic device, so that after receiving the first reply packet, the sender electronic device can determine that the received first reply packet is from a correct target electronic device.

There are a plurality of manners in which the target electronic device determines that the first request packet is used to request an IP address of the target electronic device:

Optionally, with reference to some embodiments of the second aspect, in some embodiments, that the target electronic device determines that the first request packet is used to request an IP address of the target electronic device specifically includes: When determining that the Ethernet payload of the first request packet carries a MAC address that is the same as the MAC address of the target electronic device, the target electronic device determines that the first request packet is used to request the IP address of the target electronic device.

Optionally, with reference to some embodiments of the second aspect, in some embodiments, that the target electronic device determines that the first request packet is used to request an IP address of the target electronic device specifically includes: When determining that the MAC address of the target electronic device that is carried in the Ethernet payload of the first request packet is null or an Ethernet broadcast address, the target electronic device determines that the first request packet is used to request the IP address of the target electronic device.

In the foregoing embodiments, according to different cases, when the Ethernet payload of the first request packet carries the MAC address that is the same as the MAC address of the target electronic device, or when the MAC address of the target electronic device carried in the Ethernet payload of the first request packet is null or the Ethernet broadcast address, the target electronic device may determine that the first request packet is used to request the IP address of the target electronic device.

With reference to some embodiments of the second aspect, in some embodiments, the sender electronic device and the target electronic device are located in different local area networks connected to a gateway server. That a target electronic device receives a first request packet broadcast by a sender electronic device specifically includes: The target electronic device receives the first request packet that is broadcast by the sender electronic device and forwarded by the gateway server as a proxy. That the target electronic device returns a first reply packet to the sender electronic device specifically includes: The target electronic device returns the first reply packet to the gateway server, so that the gateway server forwards, as a proxy, the first reply packet to the sender electronic device.

With reference to some embodiments of the second aspect, in some embodiments, the Ethernet headers or the Ethernet payloads of the first request packet and the first reply packet carry a proxy forwarding identifier, and the proxy forwarding identifier is used to request the gateway sewer to forward, as a proxy, the first request packet or the first reply packet.

In the foregoing embodiment, the sender electronic device and the target electronic device are located in different local area networks, and the first request packet and the first reply packet may be forwarded by the gateway server as a proxy, to obtain an IP address across local area networks.

According to a third aspect, an embodiment of this application provides an electronic device, used as a sender electronic device. The electronic device includes one or more processors and a memory, the memory is coupled to the one or more processors, the memory is configured to store computer program code, and the computer program code includes computer instructions. The one or more processors invoke the computer instructions, so that the electronic device performs the following operations: broadcasting a first request packet in a network, where an Ethernet payload of the first request packet includes a MAC address of a target electronic device; receiving a first reply packet returned by the target electronic device, where an Ethernet payload of the first reply packet includes an IP address of the target electronic device; and obtaining the IP address of the target electronic device from the first reply packet.

With reference to the third aspect, in some embodiments, an Ethernet header or the Ethernet payload of the first request packet carries a request identifier, and the request identifier is used to indicate that the first request packet is used to request the IP address of the target electronic device based on the MAC address of the target electronic device.

With reference to some embodiments of the third aspect, in some embodiments, an Ethernet header or the Ethernet payload of the first reply packet carries a reply identifier, and the reply identifier is used to indicate that the first reply packet is used to reply to the first request packet.

With reference to some embodiments of the third aspect, in some embodiments, the first request packet and the first reply packet are data frames at a data link layer, the Ethernet header of the first request packet includes an Ethernet broadcast address, and the Ethernet header of the first reply packet includes a MAC address of the sender electronic device.

With reference to some embodiments of the third aspect, in some embodiments, the Ethernet payload of the first request packet further includes an IP address and the MAC address of the sender electronic device, and the Ethernet payload of the first reply packet further includes the MAC address of the target electronic device.

With reference to some embodiments of the third aspect, in some embodiments, the one or more processors are further configured to invoke the computer instructions, so that the electronic device performs the following operation: storing the IP address of the target electronic device in the memory.

With reference to some embodiments of the third aspect, in some embodiments, the one or more processors are further configured to invoke the computer instructions, so that the electronic device performs the following operations:

invoking a distributed reverse address resolution protocol interface to request to obtain the IP address of the target electronic device; and constructing the first request packet in response to the request for invoking the distributed reverse address resolution protocol interface to obtain the IP address of the target electronic device.

With reference to some embodiments of the third aspect, in some embodiments, the request for invoking the distributed reverse address resolution protocol interface to obtain the IP address of the target electronic device carries the MAC address of the target electronic device.

With reference to some embodiments of the third aspect, in some embodiments, the request for invoking the distributed reverse address resolution protocol interface to obtain the IP address of the target electronic device carries a device identifier of the target electronic device other than the MAC address of the target electronic device, and the device identifier is used to uniquely identify the target electronic device in the sender electronic device. The one or more processors are further configured to invoke the computer instructions, so that the electronic device performs the following operation: determining the MAC address of the target electronic device based on the device identifier of the target electronic device.

With reference to some embodiments of the third aspect, in some embodiments, the one or more processors are further configured to invoke the computer instructions, so that the electronic device performs the following operations: establishing a communication connection to the target electronic device by using a recorded IP address, where the recorded IP address is an IP address of the target electronic device that is recorded by the sender electronic device when the sender electronic device establishes a communication connection to the target electronic device last time; when failing to resolve the recorded IP address, performing the step of invoking the distributed reverse address resolution protocol interface to request to obtain the IP address of the target electronic device.

With reference to some embodiments of the third aspect, in some embodiments, the one or more processors are further configured to invoke the computer instructions, so that the electronic device performs the following operations: performing address resolution on the recorded IP address to obtain a MAC address corresponding to the recorded IP address; and when the MAC address corresponding to the record IP address cannot be obtained, or the obtained MAC address corresponding to the recorded IP address is different from the MAC address of the target electronic device, determining that resolution of the recorded IP address fails.

With reference to some embodiments of the third aspect, in some embodiments, the one or more processors are further configured to invoke the computer instructions, so that the electronic device performs the following operations: searching a local distributed reverse address resolution protocol entry, to determine whether an unaged mapping entry including the IP address of the target electronic device exists, where the local distributed reverse address resolution protocol entry includes a mapping entry between a MAC address and an IP address of an electronic device that has established a communication connection to the sender electronic device, an aged mapping entry is invalid, and an unaged mapping entry is valid; and when determining that the local distributed reverse address resolution protocol entry does not include an unaged mapping entry including the IP address of the target electronic device, performing the step of constructing the first request packet.

With reference to some embodiments of the third aspect, in some embodiments, the one or more processors are further configured to invoke the computer instructions, so that the electronic device performs the following operations: periodically performing heartbeat detection on a mapping entry in the local distributed reverse address resolution protocol entry, where the heartbeat detection is used to determine that a communication connection can be successfully established, by using an IP address in the mapping entry, to an electronic device to which a corresponding MAC address in the mapping entry belongs; and when heartbeat detection on a mapping entry fails for a preset quantity of consecutive detections, setting the mapping entry to aged.

With reference to some embodiments of the third aspect, in some embodiments, the sender electronic device and the target electronic device are located in different local area networks connected to a gateway server; and the one or more processors are specifically configured to invoke the computer instructions, so that the electronic device performs the following operation: receiving the first reply packet that is returned by the target electronic device and forwarded by the gateway server as a proxy.

With reference to some embodiments of the third aspect, in some embodiments, the Ethernet headers or the Ethernet payloads of the first request packet and the first reply packet carry a proxy forwarding identifier, and the proxy forwarding identifier is used to request the gateway sewer to forward, as a proxy, the first request packet or the first reply packet.

With reference to some embodiments of the third aspect, in some embodiments, the MAC address of the target electronic device that is carried in the Ethernet payload of the first request packet is a MAC address of one electronic device, and the request identifier is a first value in a preset field.

With reference to some embodiments of the third aspect, in some embodiments, the MAC address of the target electronic device that is carried in the Ethernet payload of the first request packet is MAC addresses of a plurality of electronic devices, and the request identifier is a second value in the preset field.

With reference to some embodiments of the third aspect, in some embodiments, the first request packet is used to request IP addresses of all electronic devices in a local area network, the MAC address of the target electronic device that is carried in the Ethernet payload of the first request packet is null or an Ethernet broadcast address, and the request identifier is a third value in the preset field.

With reference to some embodiments of the third aspect, in some embodiments, the one or more processors are further configured to invoke the computer instructions, so that the electronic device performs the following operation: when receiving the first reply packet returned by the target electronic device, refreshing a recorded online status of the target electronic device to online, where the online status of the target electronic device being online indicates that the target electronic device is in a state in which a communication connection to the target electronic device can be established.

According to a fourth aspect, an embodiment of this application provides a chip system. The chip system is applied to an electronic device, the chip system includes one or more processors, and the processor is configured to invoke computer instructions, so that the electronic device performs the method described in any one of the first aspect and the possible implementations of the first aspect.

It may be understood that the chip system may include one processor 110 in the electronic device 100 shown in FIG. 7, or may include a plurality of processors 110 in the electronic device 100 shown in FIG. 7. The chip system may further include one or more other chips, for example, may include an image signal processing chip in the camera 193 in the electronic device 100 shown in FIG. 7, or may include an image display chip in the display 194. This is not limited herein.

According to a fifth aspect, an embodiment of this application provides a computer program product including instructions. When the computer program product runs on an electronic device, the electronic device is caused to perform the method described in any one of the first aspect and the possible implementations of the first aspect.

According to a sixth aspect, an embodiment of this application provides a computer-readable storage medium, including instructions. When the instructions are run on an electronic device, the electronic device is caused to perform the method described in any one of the first aspect and the possible implementations of the first aspect.

It may be understood that the electronic device provided in the third aspect, the chip system provided in the fourth aspect, the computer program product provided in the fifth aspect, and the computer storage medium provided in the sixth aspect are all configured to perform the method provided in the first aspect of embodiments of this application. Therefore, for beneficial effects that can be achieved, refer to beneficial effects in a corresponding method. Details are not described herein again.

According to a seventh aspect, an embodiment of this application provides an electronic device, used as a target electronic device. The electronic device includes one or more processors and a memory, the memory is coupled to the one or more processors, the memory is configured to store computer program code, and the computer program code includes computer instructions. The one or more processors invoke the computer instructions, so that the electronic device performs the following operations: receiving a first request packet broadcast by a sender electronic device, where an Ethernet payload of the first request packet carries a MAC address of the target electronic device; determining that the first request packet is used to request an IP address of the target electronic device; and returning a first reply packet to the sender electronic device, where an Ethernet payload of the first reply packet carries the IP address of the target electronic device.

With reference to the seventh aspect, in some embodiments, an Ethernet header or the Ethernet payload of the first request packet carries a request identifier, and the request identifier is used to indicate that the first request packet is used to request the IP address of the target electronic device based on the MAC address of the target electronic device.

With reference to some embodiments of the seventh aspect, in some embodiments, an Ethernet header or the Ethernet payload of the first reply packet carries a reply identifier, and the reply identifier is used to indicate that the first reply packet is used to reply to the first request packet.

With reference to some embodiments of the seventh aspect, in some embodiments, the first request packet and the first reply packet are data frames at a data link layer, the Ethernet header of the first request packet includes an Ethernet broadcast address, and the Ethernet header of the first reply packet includes a MAC address of the sender electronic device.

With reference to some embodiments of the seventh aspect, in some embodiments, the Ethernet payload of the first request packet further includes an IP address and a MAC address of the sender electronic device, and the Ethernet payload of the first reply packet further includes the MAC address of the target electronic device.

With reference to some embodiments of the seventh aspect, in some embodiments, the one or more processors are specifically configured to invoke the computer instructions, so that the electronic device performs the following operation:

when determining that the Ethernet payload of the first request packet carries a MAC address that is the same as the MAC address of the target electronic device, determining that the first request packet is used to request the IP address of the target electronic device.

With reference to some embodiments of the seventh aspect, in some embodiments, the one or more processors are specifically configured to invoke the computer instructions, so that the electronic device performs the following operation: when determining that the MAC address of the target electronic device that is carried in the Ethernet payload of the first request packet is null or an Ethernet broadcast address, determining that the first request packet is used to request the IP address of the electronic device.

With reference to some embodiments of the seventh aspect, in some embodiments, the sender electronic device and the target electronic device are located in different local area networks connected to a gateway server; and the one or more processors are specifically configured to invoke the computer instructions, so that the electronic device performs the following operations: receiving the first request packet that is broadcast by the sender electronic device and forwarded by the gateway server as a proxy; and returning the first reply packet to the gateway server, so that the gateway server forwards, as a proxy, the first reply packet to the sender electronic device.

With reference to some embodiments of the seventh aspect, in some embodiments, the Ethernet headers or the Ethernet payloads of the first request packet and the first reply packet carry a proxy forwarding identifier, and the proxy forwarding identifier is used to request the gateway sewer to forward, as a proxy, the first request packet or the first reply packet.

According to an eighth aspect, an embodiment of this application provides a chip system. The chip system is applied to an electronic device, the chip system includes one or more processors, and the processor is configured to invoke computer instructions, so that the electronic device performs the method described in any one of the second aspect and the possible implementations of the second aspect.

It may be understood that the chip system may include one processor 110 in the electronic device 100 shown in FIG. 7, or may include a plurality of processors 110 in the electronic device 100 shown in FIG. 7. The chip system may further include one or more other chips, for example, may include an image signal processing chip in the camera 193 in the electronic device 100 shown in FIG. 7, or may include an image display chip in the display 194. This is not limited herein.

According to a ninth aspect, an embodiment of this application provides a computer program product including instructions. When the computer program product runs on an electronic device, the electronic device is caused to perform the method described in any one of the second aspect and the possible implementations of the second aspect.

According to a tenth aspect, an embodiment of this application provides a computer-readable storage medium, including instructions. When the instructions are run on an electronic device, the electronic device is caused to perform the method described in any one of the second aspect or the possible implementations of the second aspect.

It may be understood that the electronic device provided in the seventh aspect, the chip system provided in the eighth aspect, the computer program product provided in the ninth aspect, and the computer storage medium provided in the tenth aspect are all configured to perform the method provided in the second aspect of embodiments of this application. Therefore, for beneficial effects that can be achieved, refer to beneficial effects in a corresponding method. Details are not described herein again.

DESCRIPTION OF EMBODIMENTS

Figures 1, 2:
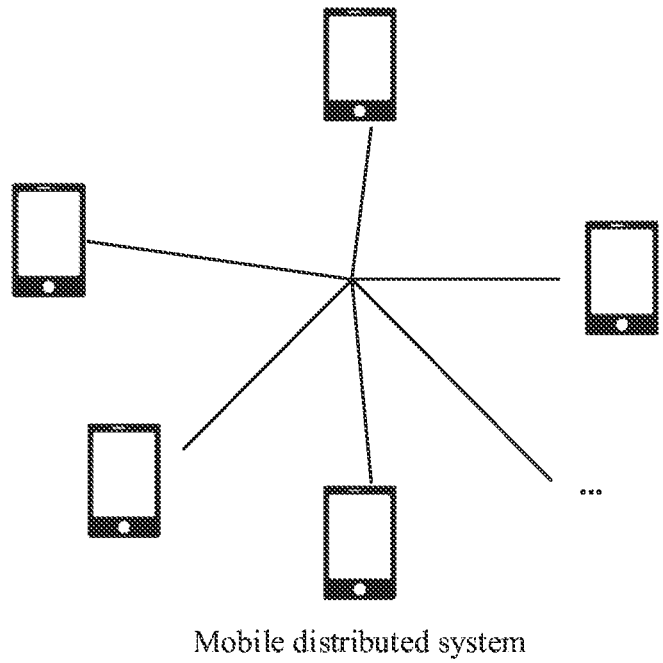
FIG. 1 is a schematic diagram of a scenario of a mobile distributed system according to an embodiment of this application.
FIG. 2 is a schematic diagram of a correspondence between an OSI seven-layer reference model and a TCP/IP four-layer conceptual model.

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that, a term "and/or" used in this application indicates and includes any one or all of possible combinations of one or more listed items.

The following terms "first" and "second" are merely intended for a purpose of description, and shall not be understood as an implication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Because embodiments of this application relate to application of a reverse address resolution technology, for ease of understanding, the following first describes related terms and concepts in embodiments of this application.

(1) Open System Interconnect (Open System Interconnect, OSI) Reference Model:

The OSI reference model is a network interconnection model studied by the International Organization for Standardization. The OSI reference model defines a seven-layer framework for network interconnection:

Physical layer: used to transmit raw bit flows on mechanical, electronic, and timing interface communication channels.

Data link layer: used to provide media access and link control, that is, can perform physical addressing, and can convert a raw bit flow into a logical transmission line.

Network layer: used for IP address selection and route selection, that is, can control an operation of a subnet, such as logical addressing, packet transmission, and route selection.

Transport layer: used to establish, manage, and maintain end-to-end connections, that is, can receive data from a session layer. If necessary, the data is divided and sent to the network layer. In addition, the data segments can reach a peer end effectively.

Session layer: used to establish, manage, and maintain sessions, that is, can establish and manage sessions between users on different machines.

Presentation layer: used to convert data formats and encrypt data, that is, perform syntax and semantics analysis and associated processing on information, for example, encryption and decryption, conversion and translation, and compression and decompression.

Application layer: used to provide services for applications. The application layer may include various application protocols, such as hypertext transfer protocol (hypertext transfer protocol, HTTP), file transfer protocol (file transfer protocol, FTP), simple mail transfer protocol (simple mail transfer protocol, SMTP), and post office protocol-version 3 (post office protocol-version 3, POP3).

Each layer implements its own functions and protocols, and communicates with an interface of a neighbor layer. The service definition of the OSI reference model details services provided by each layer. A service at a layer is a capability of the layer and its lower layers, and is provided for a higher layer through interfaces. The services provided by each layer are irrelevant to how these services are implemented.

(2) TCP/IP Protocol Suite:

The OSI reference model is a theoretical model. Based on the OSI reference model, the TCP/IP protocol suite proposes a TCP/IP four-layer conceptual model. FIG. 2 is a schematic diagram of a correspondence between the OSI seven-layer reference model and the TCP/IP four-layer conceptual model.

A data link layer corresponds to the physical layer and the data link layer in the OSI reference model.

A network layer corresponds to the network layer in the OSI reference model.

A transport layer corresponds to the transport layer in the OSI reference model.

An application layer corresponds to the session layer, the presentation layer, and the application layer in the OSI reference model.

It may be understood that, because data packets in the reverse address resolution method in embodiments of this application mainly relate to a function of searching for an IP address based on a MAC address, the data packets may be classified at the data link layer of the TCP/IP protocol suite.

(3) Address Resolution Protocol (Address Resolution Protocol, ARP) Protocol:

The ARP protocol is a TCP/IP protocol in which a MAC address is obtained based on an IP address.

Figure 3:
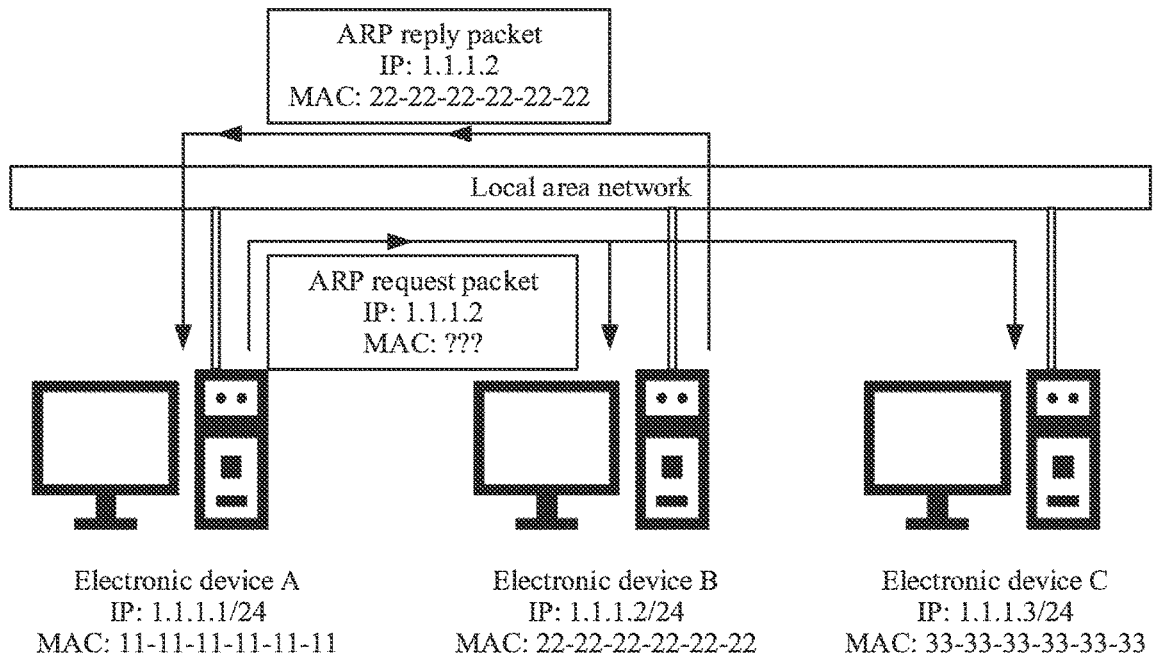
FIG. 3 is a schematic diagram of a working process of the ARP protocol.

For example, FIG. 3 is a schematic diagram of a working process of the ARP protocol in the conventional technology. An electronic device A, an electronic device B, and an electronic device C are all connected over the Ethernet. An IP address of the electronic device A is 1.1.1.1/24, and a physical address (media access control address, MAC address) of the electronic device A is 11-11-11-11-11-11. An IP address of the electronic device B is 1.1.1.2/24, and a MAC address of the electronic device B is 22-22-22-22-22-22. An IP address of the electronic device C is 1.1.1.3/24, and a MAC address of the electronic device C is 33-33-33-33-33-33./24 indicates that a quantity of bits of a subnet mask in a 32-bit IP address is 24.

In a case in which the electronic device A knows the IP address of the electronic device B, when the electronic device A is to communicate with the electronic device B, the electronic device A first checks whether an ARP cache of the electronic device A includes the MAC address of the electronic device B. If the ARP cache does not include the MAC address of the electronic device B, the electronic device A broadcasts an ARP request packet in a local area network. The packet includes an IP address of an electronic device with which the electronic device A intends to communicate, that is, the IP address of the electronic device B in FIG. 2. The ARP request packet is broadcast to all other networked electronic devices in the local area network, for example, the electronic device B and the electronic device C.

After receiving the ARP request packet, the electronic device B determines, through comparison, that the IP address in the ARP request packet is the same as the IP address of the electronic device B, transmits the MAC address of the electronic device B to the electronic device A by using the ARP reply packet, and updates an ARP cache of the electronic device B, that is, stores an IP address/MAC address pair of the electronic device A for subsequent use. After obtaining the MAC address of the electronic device B, the electronic device A may communicate with the electronic device B. In addition, the electronic device A also stores an IP address/MAC address pair of the electronic device B in the ARP cache of the electronic device A.

After receiving the ARP request packet, the electronic device C determines, through comparison, that the IP address in the ARP request packet is different from the IP address of the electronic device C, and discards the ARP request packet.

By using the ARP protocol, the electronic device A obtains a MAC address of a target electronic device by broadcasting an ARP request packet carrying an IP address of the target electronic device.

(4) RARP Protocol:

The RARP protocol is a TCP/IP protocol in which an IP address of an electronic device is obtained based on a MAC address of the electronic device, and an electronic device in a local area network is allowed to request an IP address of the electronic device from an ARP table or a cache of a gateway sewer. It should be understood that the RARP protocol is only used by an electronic device to request an IP address of the electronic device from the gateway server.

A network administrator creates a table in a gateway router of the local area network to map a MAC address to a corresponding IP address. When a new electronic device is set, an RARP client program of the electronic device needs to request an IP address corresponding to a MAC address of the electronic device from an RARP server on the gateway router. Assuming that a record has been set in a gateway routing table, the RARP server returns the IP address to the electronic device, and the electronic device stores the obtained IP address for subsequent use. The RARP protocol can be used in the Ethernet, fiber distributed, data interface and token ring networks.

Figure 4:
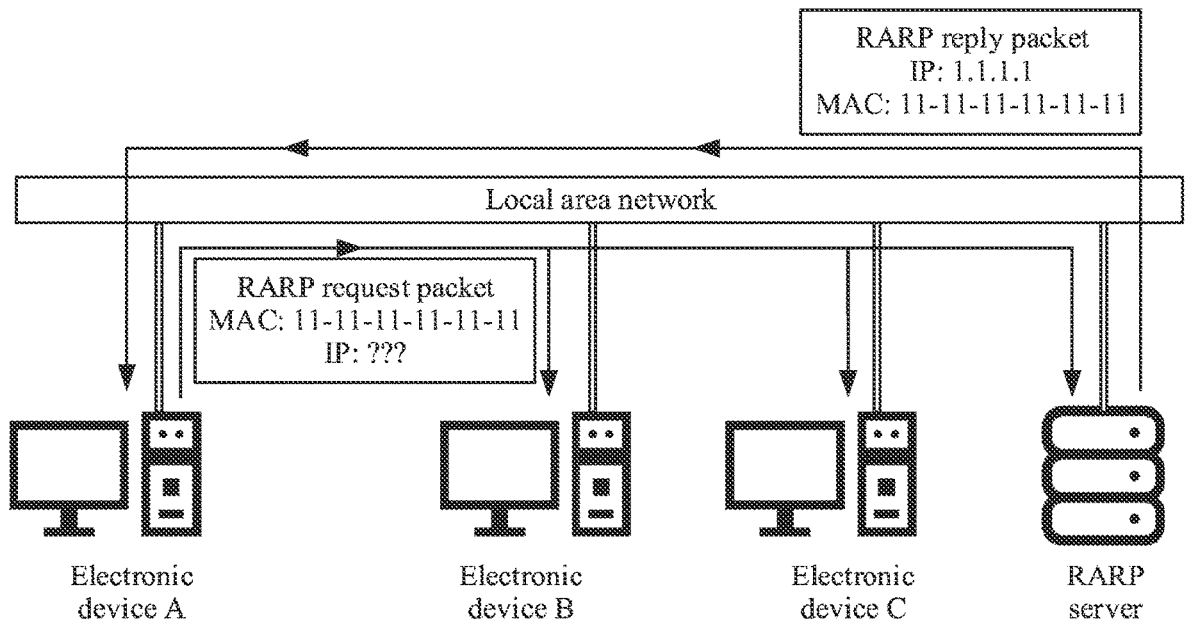
FIG. 4 is a schematic diagram of a working process of the RARP protocol.

For example, FIG. 4 is a schematic diagram of a working process of the RARP protocol in the conventional technology. An electronic device A, an electronic device B, an electronic device C, and an RARP server in a gateway router of a local area network are all connected over the local area network.

Each device on the network has a unique hardware address, which is usually a MAC address allocated by a device vendor. After accessing the network, the electronic device A reads a MAC address from a network interface card, and then broadcasts an RARP request packet in the network. The RARP request packet includes a MAC address 11-11-11-11-11-11 of the electronic device A, to request the RARP server to reply with an IP address.

After receiving the RARP request packet, the electronic device B and the electronic device C discard the RARP request packet.

After receiving the RARP request packet, the RARP server allocates an IP address 1.1.1.1 to the electronic device A, and sends an RARP reply packet to the electronic device A. The RARP reply packet includes the IP address allocated to the electronic device A. After receiving the RARP reply packet, the electronic device A performs communication by using the obtained IP address.

By using the RARP protocol, the electronic device A may obtain, by broadcasting the RARP request packet carrying the MAC address of electronic device A, the IP address that is allocated to the electronic device A and replied by the RARP server.

Figure 5:
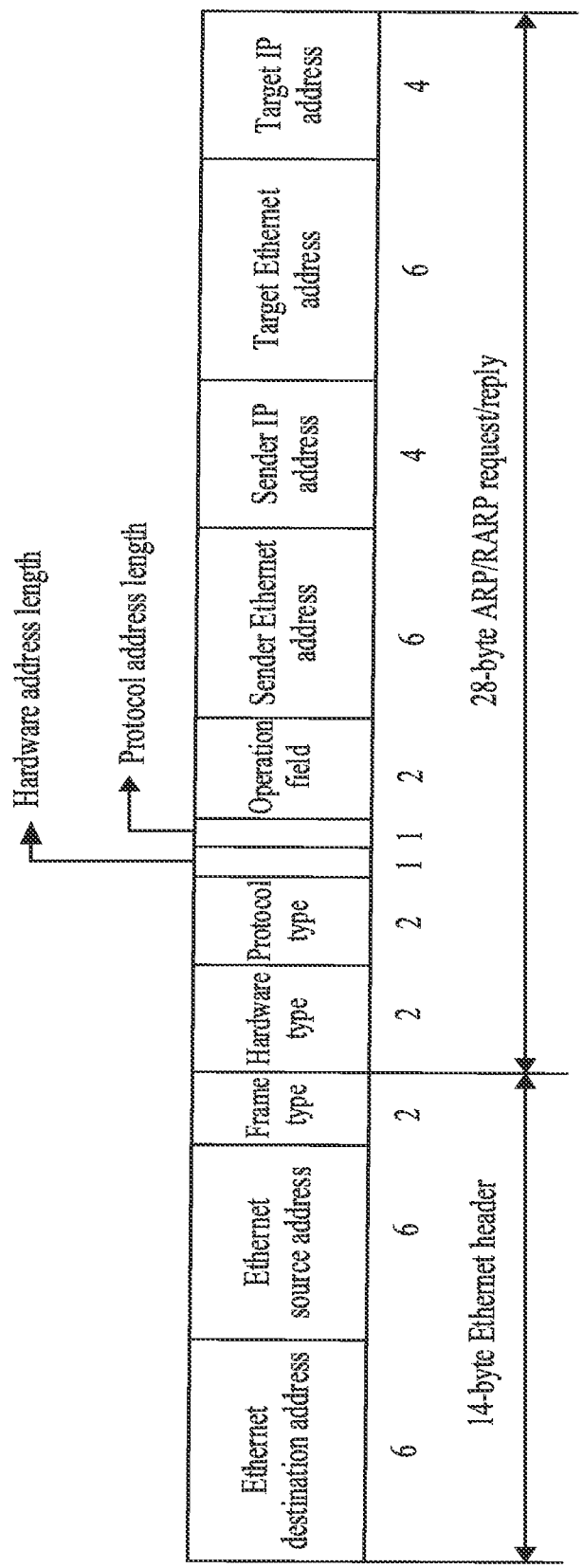
FIG. 5 is a schematic diagram of an ARP/RARP packet format.

(5) ARP/RARP Packet Format:

In the conventional technology, data packets in the ARP protocol and the RARP protocol use packet formats of a same structure. FIG. 5 is a schematic diagram of an ARP/RARP packet format in the conventional technology.

The ARP/RARP packet format includes 12 fields that occupy 32 bytes, including a 14-byte Ethernet header and a 28-byte ARP/RARP request/reply.

The Ethernet header includes three fields: 6-byte Ethernet destination address, 6-byte Ethernet source address, and 2-byte frame type.

Both the Ethernet destination address and the Ethernet source address are physical addresses.

If the Ethernet destination address is all 1s, the Ethernet destination address is a broadcast address.

The Ethernet source address is a MAC address of a sender.

The frame type indicates a type of following data. For example, a frame type value of an ARP request or reply is 0x0806.

The ARP/RARP request/reply has nine fields: 2-byte hardware type, 2-byte protocol type, 1-byte hardware address length, 1-byte protocol address length, 2-byte operation field, 6-byte sender Ethernet address, 4-byte sender IP address, 6-byte target Ethernet address, and 4-byte target IP address.

The hardware type indicates a type of a hardware address. For example, when a value of this field is 1, it indicates that the type of the hardware address is an Ethernet address.

The protocol type indicates a type of a protocol address to be mapped. For example, when a value of this field is 0x0800, it indicates that the protocol address is an IP address.

The hardware address length and the protocol address length respectively indicate a length of a hardware address and a length of a protocol address in bytes. For example, for an APR request or reply to an Ethernet IP address, values of the hardware address length and the protocol address length are 6 and 4, respectively.

The operation field indicates four operation types: ARP request (value: 1), ARP reply (value: 2), RARP request (value: 3), and RARP reply (value: 4).

The sender Ethernet address and the sender IP address respectively record an Ethernet address and an IP address of a sender.

The target Ethernet address and the target IP address respectively record a physical address and an IP address of a target device.

(6) Wi-Fi P2P:

The Wi-Fi P2P is a technology for constructing a mobile distributed system in the conventional technology, and is an important technical specification launched by the Wi-Fi Alliance (Wi-Fi Alliance) in 2010, and is a point-to-point and one-to-many technology. The Wi-Fi P2P is referred to as Wi-Fi Direct (Wi-Fi Direct) in Android and Airdrop (Airdrop) in iOS.

A Wi-Fi P2P architecture defines three components, which are referred to one device and two roles. The three components are as follows:

P2P device: The P2P device is a terminal entity in the P2P architecture and can also be considered as a Wi-Fi device.

P2P group owner: The P2P group owner (GO for short) is a role similar to an access point (AP) in a Wi-Fi network structure, that is, a Wi-Fi hotspot.

P2P client: Client for short. The P2P client is another role, and a function is similar to that of a station (STA) in the Wi-Fi network structure. The P2P client is a terminal device that has a Wi-Fi communication function and is connected to a wireless network.

Before a P2P group is set up, smart terminals are P2P devices. After P2P negotiation is complete between these P2P devices, only one P2P device can function as the GO (that is, the AP), and another P2P device functions as the client. The Wi-Fi P2P is used as a transmission means, and a socket (socket) is used as an information carrier for communication. The P2P group owner automatically notifies all clients of physical address (MAC) information. In the P2P group structure formed by using the Wi-Fi P2P technology, an IP address cannot be searched for based on a physical address.

(7) Local ARP Entry:

An electronic device stores a local ARP entry, and the local ARP entry is used at a data link layer and is used to store a mapping between a MAC address and an IP address of another electronic device that has established a communication connection to the electronic device. According to the specification of the TCP/IP protocol, a mapping entry in the local ARP entry has an aging time, and the aging time is short.

Specifically, if a local ARP entry of an electronic device A stores an entry 1: a mapping between a MAC address and an IP address of an electronic device B, after a communication connection between the electronic device A and the electronic device B ends, the entry 1 in the local ARP entry enters an aging time countdown. If no communication connection is re-established between the electronic device A and the electronic device B before the aging time countdown ends, the entry 1 is aged, and is deleted from the local ARP entry. The MAC address and the IP address of the electronic device B are no longer stored in the local ARP entry.

(8) Local Distributed Reverse Address Resolution Protocol (Distributed Reverse Address Resolution Protocol, DRARP) Entry:

In embodiments of this application, an electronic device may further store a local DRARP entry. The local DRARP entry is applicable to a data link layer, and is used to store a mapping between a MAC address and an IP address of another electronic device that has established a communication connection to the electronic device.

Different from the local ARP entry, after a mapping entry recorded in the local DRARP entry ages, the entire mapping entry is not deleted directly. Instead, a MAC address in the mapping entry is retained.

The electronic device may determine, according to a plurality of indicators, whether to age a mapping entry recorded in the local DRARP entry.

For example, the electronic device may perform heartbeat detection on a mapping entry recorded in the local DRARP entry, and age the mapping entry in the local DRARP entry based on a heartbeat detection result.

Specifically, if an electronic device A stores an entry 1: a mapping between a MAC address and an IP address of an electronic device B, the electronic device A periodically and continuously performs heartbeat detection on the entry 1, to determine whether a communication connection can be normally established to an electronic device with the MAC address in the entry 1 by using the IP address in the entry 1. If the communication connection can be normally established, the heartbeat detection succeeds. If the heartbeat detection succeeds, the electronic device A keeps the entry 1 valid. If the entry 1 fails to be detected for a preset quantity of consecutive detections (for example, three times), the electronic device A sets the entry 1 to aged, so that the mapping represented by the entry 1 is invalid, but the entry 1 is not deleted.

For example, the electronic device may further age, based on preset aging duration, a mapping entry recorded in the local DRARP entry.

Specifically, if the electronic device A stores the entry 1: the mapping between the MAC address and the IP address of the electronic device B, after the communication connection between the electronic device A and the electronic device B is disconnected for the preset aging duration, the electronic device A may set the entry 1 to aged.

It may be understood that the electronic device may further age, based on another indicator, a mapping entry recorded in the local DRARP entry. For example, the mapping entry may be aged when it is determined that an electronic device in the mapping entry is offline, or the mapping entry may be aged when it is determined that an IP address of the electronic device in the mapping entry is changed. This may be specifically set according to an actual situation, and is not limited herein.

It should be noted that, in addition to a mapping between a MAC address and an IP address of an electronic device, a mapping entry in the local DRARP entry may further include a mapping between other information of the electronic device and the MAC address. This is not limited herein. For example, the entry 1 may further include a device name of the electronic device B, a device identifier of the electronic device B, or the like. This is not limited herein.

Optionally, the mapping entry in the local DRARP entry may further include an aging flag bit, and when a value of the aging flag bit is a first value, it indicates that the mapping entry is valid. When the value of the aging flag bit is a second value, it indicates that the mapping entry is aged, and the mapping represented by the mapping entry is invalid.

Optionally, when the mapping entry in the local DRARP entry is set to aged, the electronic device may delete the IP address in the mapping entry.

In the conventional technology, neither the ARP/RARP protocol nor the Wi-Fi P2P supports obtaining an IP address of another electronic device without a server.

However, in a mobile distributed system, an electronic device may move to various locations at any time. In different geographical locations, the electronic device may access different local area networks, and in different local area networks, an IP address applied for by the electronic device may change. Therefore, in such a case in which an IP address changes rapidly and a status of a server is unstable, it is very necessary for an electronic device to obtain a changed IP address of a target electronic device in the local area network in time without relying on the server.

In embodiments of this application, in the mobile distributed system, a sender electronic device can broadcast a MAC address of a target electronic device in the local area network, and the target electronic device directly replies with an IP address of the target electronic device, so that the sender electronic device can quickly obtain the IP address of the target electronic device. In addition, the process is performed at the data link layer. Therefore, compared with a method of obtaining the IP address of the target electronic device from an application server through a plurality of interactions at the application layer, in the process, not only signaling overheads are reduced, but also an IP address of a corresponding device can be quickly obtained by using a MAC address in any local area network without depending on a server. This improves stability of network communication in the mobile distributed system.

Figure 6:
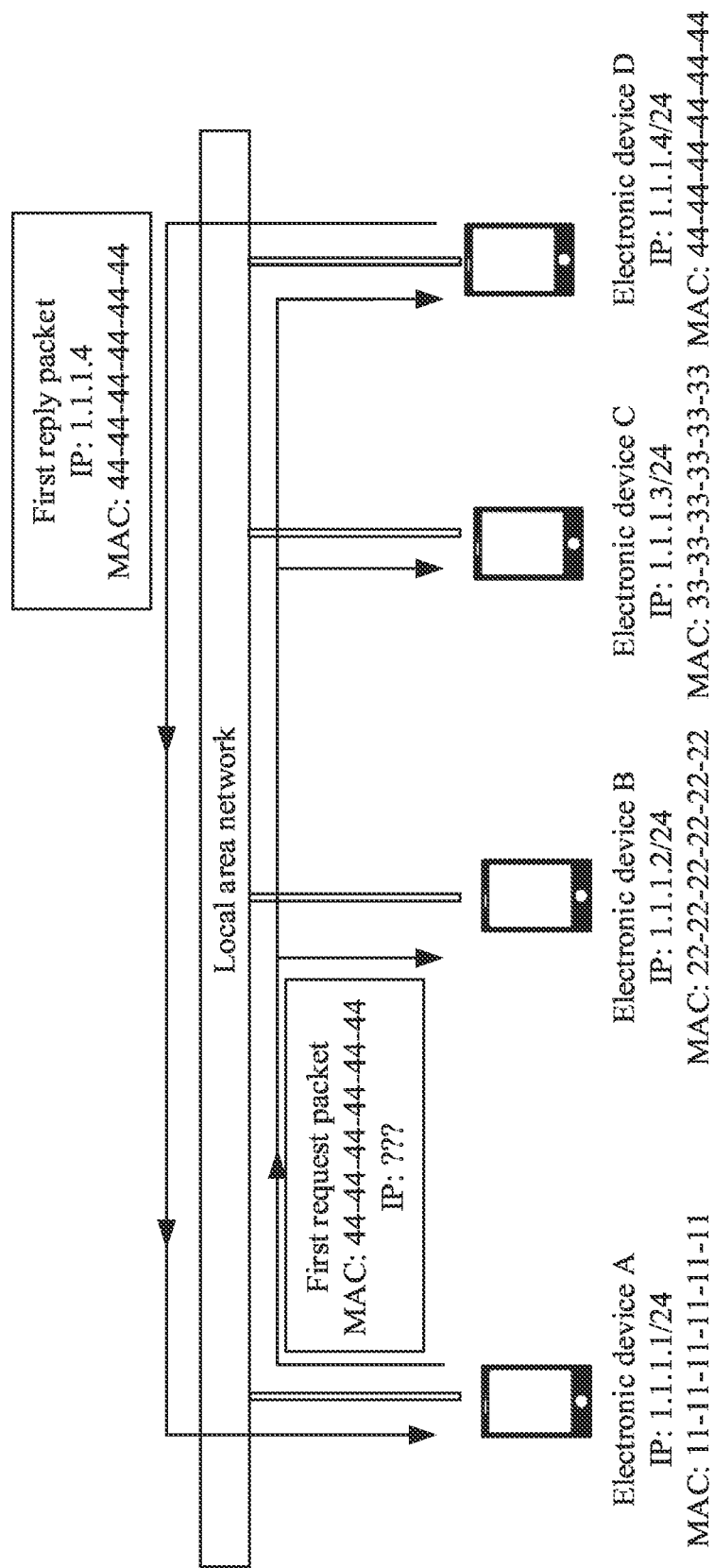
FIG. 6 is a schematic diagram of a scenario in which a reverse address resolution method is used according to an embodiment of this application.

FIG. 6 is a schematic diagram of a scenario in which a reverse address resolution method is used according to an embodiment of this application. In a mobile distributed system including an electronic device A, an electronic device B, an electronic device C, and an electronic device D, the electronic device A wants to communicate with the electronic device D. Because the electronic device A has previously communicated with the electronic device D, the electronic device A stores a MAC address 44-44-44-44-44-44 of the electronic device D. However, due to frequent movement, the electronic device D leaves the local area network in a time period, and accesses the local area network again after a time period. As a result, an IP address of the electronic device D changes. The electronic device A cannot normally communicate with the electronic device D by using a recorded previous IP address of the electronic device D. Therefore, the electronic device A broadcasts a first request packet in the local area network, and the first request packet carries the MAC address of the electronic device D, and requests to reply with the IP address of the electronic device D.

The electronic device B, the electronic device C, and the electronic device D in the local area network all receive the first request packet. After receiving the first request packet, the electronic device B and the electronic device C determine that the MAC address in the first request packet is different from those of the electronic device B and the electronic device C, and discard the first request packet. After receiving the first request packet, the electronic device D determines that the MAC address in the first request packet is the same as that of the electronic device D, and replies to the electronic device A with a first reply packet. The first reply packet carries the IP address and the MAC address of the electronic device D. After receiving the first reply packet, the electronic device A determines the latest IP address of the electronic device D, and can successfully communicate with the electronic device D.

The following describes an example electronic device 100 provided in embodiments of this application.

The example electronic device 100 may be the sender electronic device in embodiments of this application, or may be the target electronic device in embodiments of this application. This is not limited herein.

Figure 7:
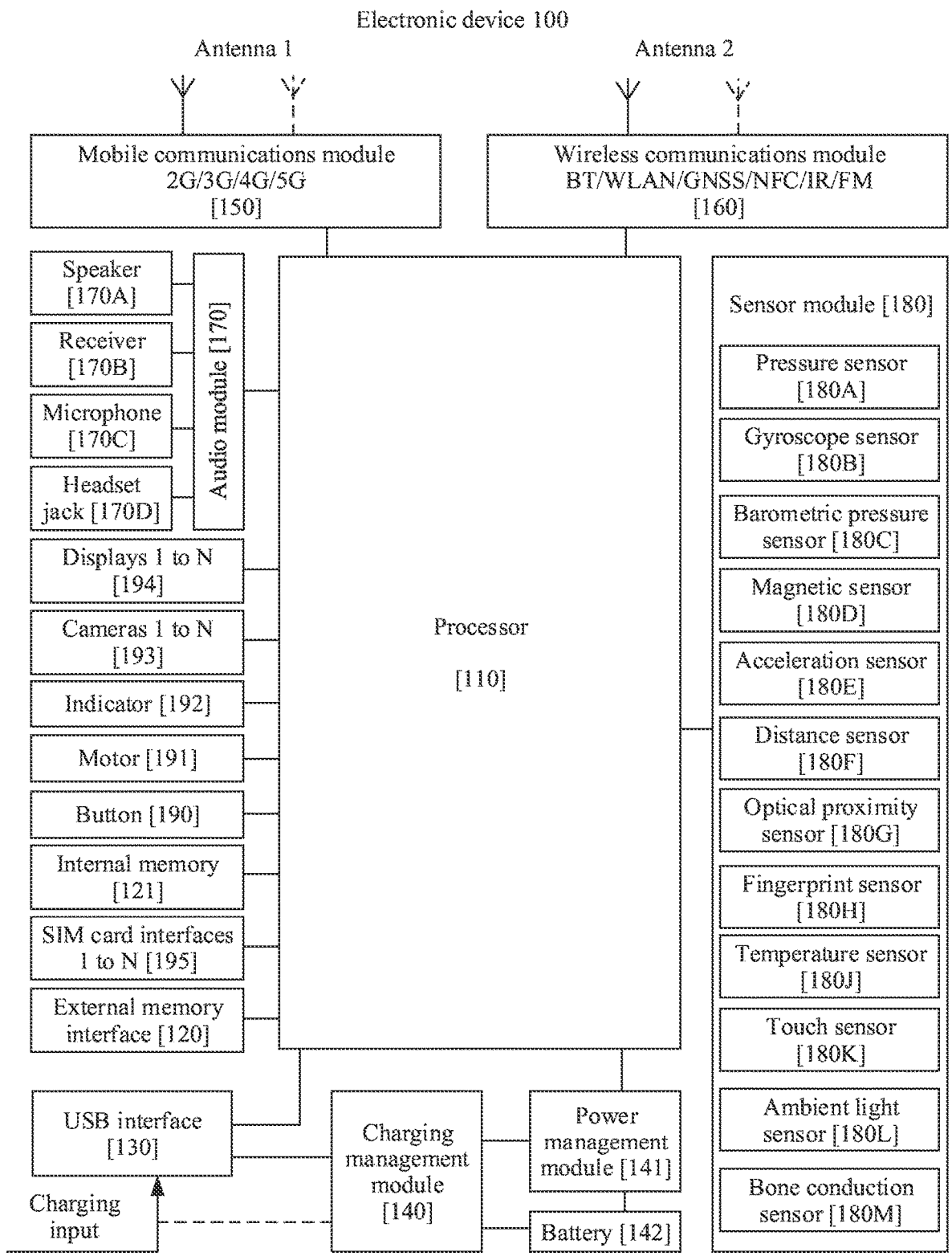
FIG. 7 is a schematic diagram of a structure of an electronic device according to an embodiment of this application.

FIG. 7 is a schematic diagram of a structure of the electronic device 100 according to an embodiment of this application.

The following uses the electronic device 100 as an example to specifically describe the embodiments. It should be understood that the electronic device 100 may have more or fewer components than those shown in the figure, or two or more components may be combined, or different component configurations may be used. Various components shown in the figure may be implemented in hardware, software, or a combination of hardware and software that includes one or more signal processing and/or application-specific integrated circuits.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in embodiments of the present disclosure does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

The memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through the PCM bus interface. In some embodiments, the audio module 170 may alternatively transfer an audio signal to the wireless communications module 160 through the PCM interface, to implement a function of answering a call by using the Bluetooth headset. Both the I2S interface and the PCM interface may be configured to perform audio communication.

The UART interface is a universal serial data bus, and is used for asynchronous communication. The bus may be a two-way communications bus. The bus performs a conversion between serial communication and parallel communication onto-be-transmitted data. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The SIM interface may be configured to communicate with the SIM card interface 195, to implement a function of transmitting data to an SIM card or reading data in an SIM card.

The USB interface 130 is an interface that complies with a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset, to play audio by using the headset. The interface may be further configured to connect to another electronic device such as an AR device.

It can be understood that an interface connection relationship between the modules shown in embodiments of the present disclosure is merely an example for description, and does not constitute a limitation on the structure of the electronic device 100. In other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal to an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through the demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that is applied to the electronic device 100 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LIE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and connects the display 194 to the application processor. The GPU is configured to perform mathematical and geometric calculation, and perform graphics rendering. The processor 110 may include one or more GPUs that execute program instructions to generate or change display information.

The display 194 is configured to display an image, a video, or the like. The display 194 includes a display panel.

The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal, and may process another digital signal in addition to a digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a biological neural network structure, for example, by referring to a mode of transfer between human brain neurons, and may further continuously perform self-learning. The electronic device 100 may implement intelligent cognition such as image recognition, facial recognition, speech recognition, and text understanding through the NPU.

The external memory interface 120 may be configured to connect to an external memory card such as a micro SD card, to extend a storage capability of the electronic device 100. The external memory card communicates with the processor 110 through the external memory interface 120, to implement a data storage function, for example, to store files such as music and a video in the external memory card.

The internal memory 121 may be configured to store computer-executable program code, and the executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a facial recognition function, a fingerprint recognition function, and a mobile payment function), and the like. The data storage area may store data (for example, facial information template data and a fingerprint information template) and the like created when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may further be configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal to a sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170D may be the USB interface 130 or a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display 194. There are many types of pressure sensors 180A such as a resistive pressure sensor, an inductive pressure sensor, and a capacitive pressure sensor. The capacitive pressure sensor may include at least two parallel plates made of conductive materials. Capacitance between electrodes changes when force is applied to the pressure sensor 180A. The electronic device 100 determines pressure intensity based on a change of the capacitance. When a touch operation is performed on the display 194, the electronic device 100 detects a strength of the touch operation based on the pressure sensor 180A. The electronic device 100 may also calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on an icon of Messages, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during shooting. For example, when the shutter is pressed, the gyro sensor 180B detects an angle at which the electronic device 100 jitters, and calculates, based on the angle, a distance for which a lens module needs to compensate, and allows the lens to eliminate the jitter of the electronic device 100 through a reverse motion, to implement image stabilization. The gyro sensor 180B may be further used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 can detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light through the light-emitting diode. The electronic device 100 detects infrared reflected light from a nearby object through the photodiode. When sufficient reflected light is detected, it may be determined that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust luminance of the display 194 based on the sensed ambient light luminance. The ambient light sensor 180L may also be configured to automatically adjust a white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application access locking, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of the processor nearby the temperature sensor 180J, to reduce power consumption for thermal protection. In some other embodiments, when the temperature is lower than another threshold, the electronic device 100 heats up the battery 142, to avoid abnormal shutdown of the electronic device 100 caused by a low temperature. In some other embodiments, when the temperature is less than still another threshold, the electronic device 100 boosts an output voltage of the battery 142, to prevent abnormal power-off caused by a low temperature.

The touch sensor 180K is alternatively referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation acting on or near the touch sensor 180K. The touch sensor may transfer the detected touch operation to the application processor, to determine a type of a touch event. The display 194 provides a visual output related to the touch operation. In some other embodiments, the touch sensor 180K may alternatively be disposed on a surface of the electronic device 100 in a position different from that of the display 194.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to produce an incoming call vibration prompt and a touch vibration feedback. For example, touch operations performed on different applications (for example, shooting and audio playing) may correspond to different vibration feedback effects. The motor 191 may also correspond to different vibration feedback effects for touch operations performed in different areas of the display 194. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator lamp, and may be configured to indicate a charging status and a power change, or may be configured to indicate a message, a missed call, a notification, and the like.

The SIM card interface 195 is configured to be connected to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be further compatible with different types of SIM cards. The SIM card interface 195 may also be compatible with an external memory card. The electronic device 100 interacts with a network through the SIM card, to implement functions such as calling and data communication.

In embodiments of this application, by using the mobile communications module 150 or the wireless communications module 160, the electronic device 100 and another electronic device may form a mobile distributed system.

Figure 8:
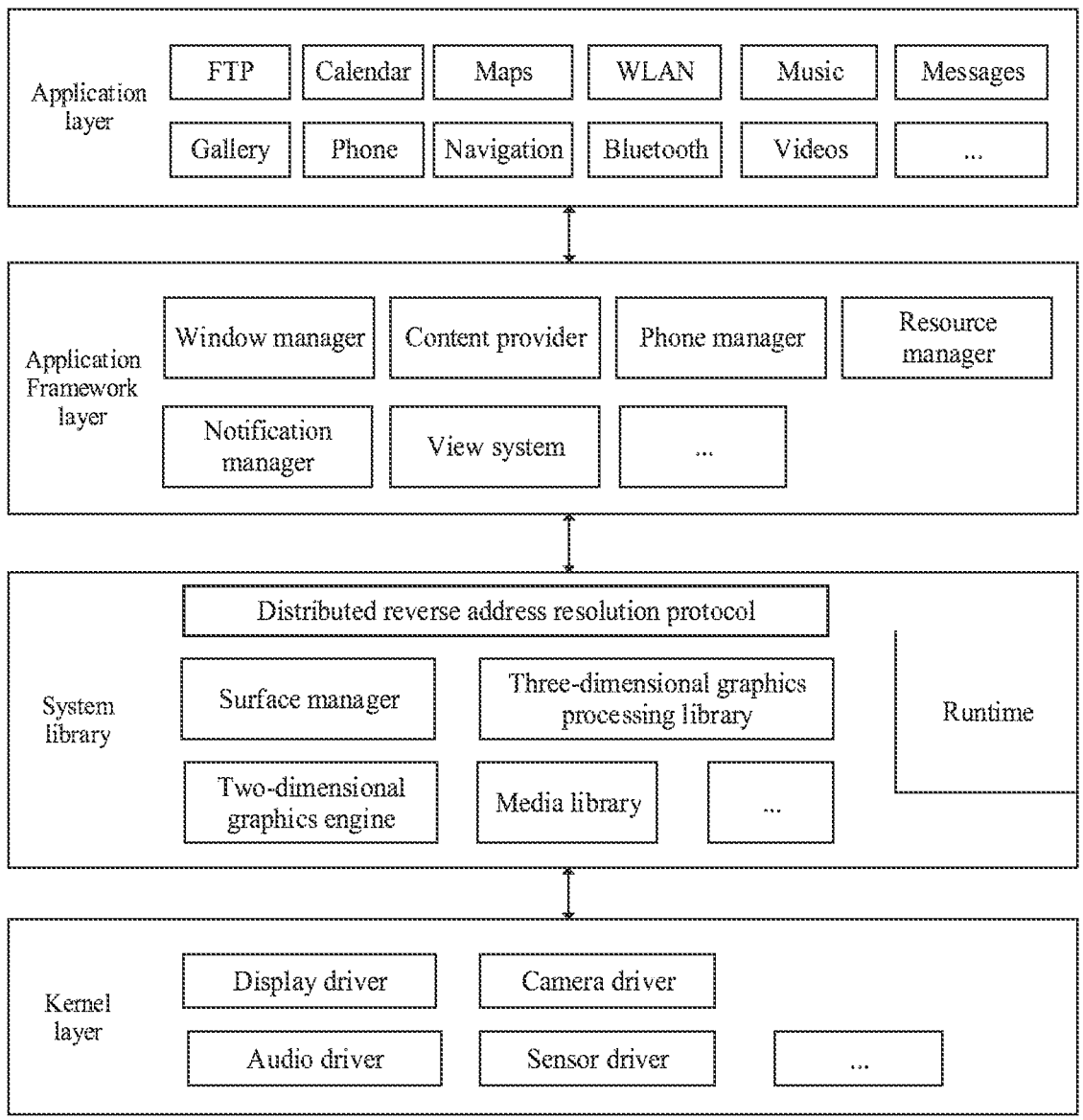
FIG. 8 is a block diagram of a software structure of an electronic device according to an embodiment of this application.

FIG. 8 is a block diagram of a software structure of the electronic device 100 according to an embodiment of this application.

In a layered architecture, software is divided into several layers, and each layer has a clear role and task. The layers communicate with each other through a software interface. In some embodiments, a system is divided into four layers: an application layer, an application framework layer, a runtime and system library, and a kernel layer from top to bottom.

The application layer may include a series of application packages.

As shown in FIG. 8, the application packages may include applications (or referred to as applications) such as FTP, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 8, the application framework layer may include a window manager, a content provider, a view system, a phone manager, a resource manager, a notification manager, and the like.

The window manager is configured to manage a window program. The window manager may obtain a size of the display, determine whether there is a status bar, lock a screen, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying text and a control for displaying a picture. The view system may be configured to construct an application. A display interface may include one or more views. For example, a display interface including a Messages notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification type message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application program running on a background or a notification that appears on the interface in a form of a dialog interface. For example, text information is prompted in the status bar, a prompt tone is produced, the electronic device vibrates, or an indicator blinks.

The runtime includes a core library and a virtual machine. The runtime is responsible for scheduling and management of the Android system.

The kernel library includes two parts: a function that needs to be invoked in java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a two-dimensional graphics engine (for example, SGL).

The surface manager is configured to manage a display subsystem and provide fusion of two-dimensional (2-Dimensional, 2D) and three-dimensional (3-Dimensional, 3D) image layers for a plurality of applications.

The media library supports playing and recording of audio and video in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement 3D graphics drawing, image rendering, composition, layer processing, and the like.

The two-dimensional graphics engine is a drawing engine for 2D drawing.

In embodiments of this application, the system library may include a distributed reverse address resolution protocol (distributed reverse address resolution protocol, DRARP), used to support a reverse address resolution protocol method in embodiments of this application, provide a capability of quickly resolving an IP address of a target electronic device based on a MAC address of the target electronic device in a mobile distributed system, and also provide a capability of quickly sensing online information of another electronic device in the mobile distributed system.

The distributed reverse address resolution protocol works at the data link layer of the TCP/IP four-layer conceptual model and provides a DRARP interface for the outside. Another layer in the TCP/IP four-layer conceptual model may obtain a latest IP address of an electronic device by invoking the DRARP interface to input identification information (a device name, a device identifier, a MAC address of the device, or the like) of the electronic device.

The kernel layer is a layer between hardware and software. The kernel layer includes at least a display driver, a camera driver, an audio driver, a sensor driver, and a virtual card driver.

It may be understood that a network protocol, for example, a protocol at each layer in the TCP/IP four-layer conceptual model, is generally deployed in the system library of the electronic device 100. However, in actual application, different protocols may be deployed at another layer of the electronic device 100 based on different requirements. This is not limited herein.

The following describes an example of a working process of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. The camera application invokes an interface at the application framework layer, so that the camera application is started. Then, the camera driver is started by invoking the kernel layer, and a static image or a video is captured by using the camera 193.

The following specifically describes the reverse address resolution method in embodiments of this application with reference to the foregoing example software and hardware structures of the electronic device 100.

A plurality of electronic devices in a local area network form a mobile distributed system. If an electronic device (referred to as a sender electronic device below) needs to establish a communication connection to another electronic device (referred to as a target electronic device below), for example, if an FTP application on the sender electronic device needs to read a file in the target electronic device, the sender electronic device needs to obtain an IP address of the target electronic device.

In this case, according to whether a local DRARP entry at a data link layer records the IP address and a MAC address of the target electronic device, the following three cases may occur:

Case 1: The local DRARP entry records the IP address and the MAC address of the target electronic device.

If the target electronic device has previously established a communication connection to the sender electronic device, both the local DRARP entry and a local ARP entry have mapping record entries that record the IP address and the MAC address of the target electronic device. However, subsequently, if no communication connection is established between the target electronic device and the sender electronic device in a time period, the mapping record entry that is of the target electronic device and that is in the local ARP entry of the sender electronic device is aged and deleted. The IP address of the target electronic device may also have changed. For example, when the target electronic device leaves and then accesses the local area network again, an IP address allocated by a gateway server to the target electronic device is different from the IP address before the target electronic device leaves the local area network. For another example, an IP address has been reallocated in the local area network, and an IP address reallocated by the gateway server to the target electronic device is different from the IP address of the target electronic device before the IP address is reallocated.

In the conventional technology, in this case, the sender electronic device can re-obtain the IP address of the target electronic device only by interacting with a server of an application for a plurality of times at an application layer.

In this embodiment of this application, the sender electronic device neither needs to perform a plurality of interactions at the application layer, nor needs to depend on a server of an application. Instead, the sender electronic device may directly obtain the IP address of the target electronic device at the data link layer, and then continue to establish a communication connection to the target electronic device.

Specifically, with reference to the TCP/IP four-layer conceptual model, the following uses a scenario A as an example to describe a signaling interaction process of an electronic device A in the TCP/IP four-layer conceptual model in embodiments of this application.

Scenario A: An application A on the electronic device A has established a communication connection to an electronic device D, and a local DRARP entry of the electronic device A stores a mapping entry between an IP address and a MAC address of the electronic device D. The mapping entry between the IP address and the MAC address of the electronic device D that is recorded in a local ARP entry of the electronic device A is aged and deleted. After a time period, the application A on the electronic device A wants to read a file in the electronic device D. The electronic device A is the foregoing sender electronic device, and the electronic device D is the foregoing target electronic device.

Figure 9A:
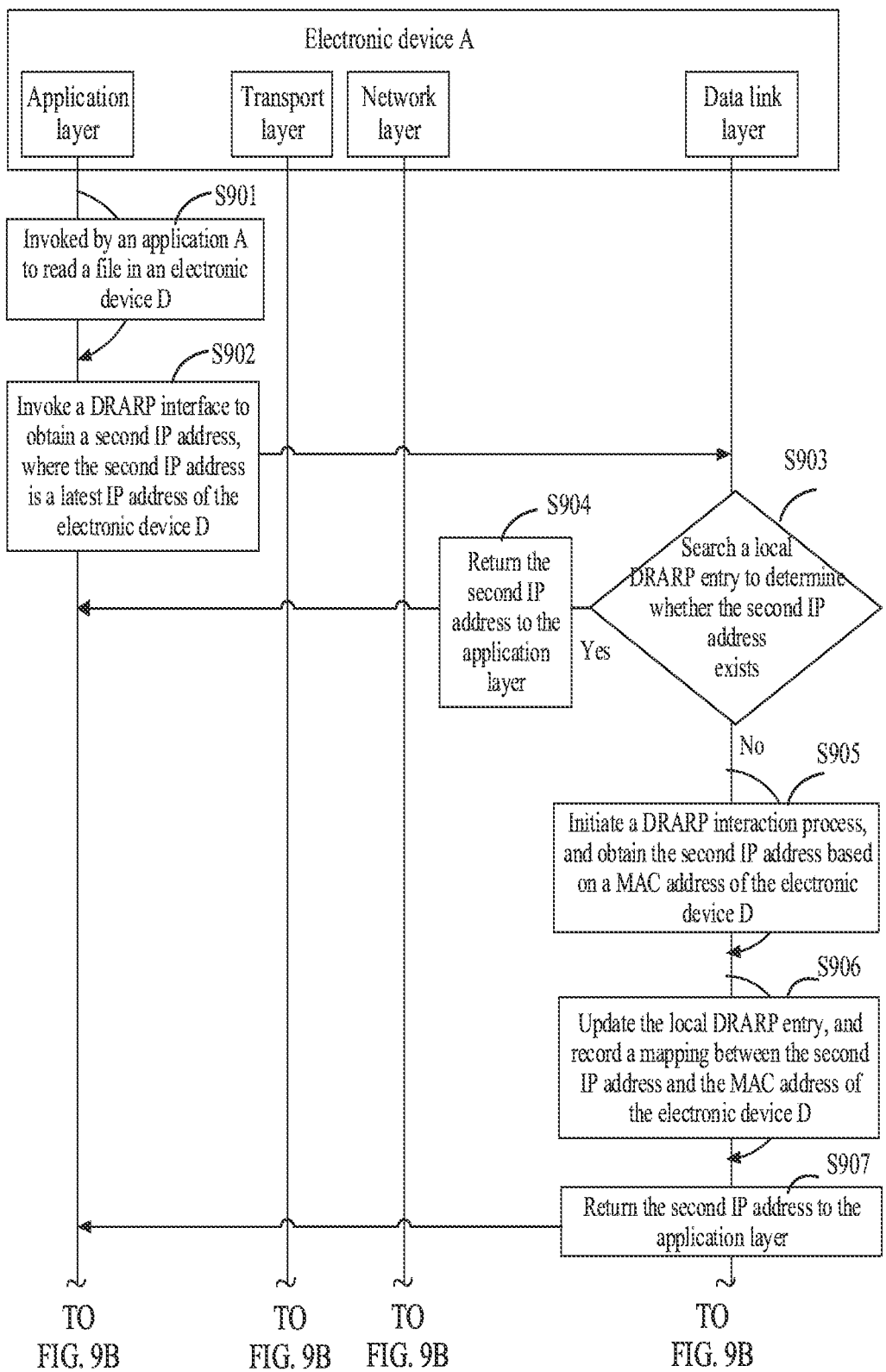
FIG. 9A to FIG. 9C are an example schematic diagram of signaling interaction of an electronic device in a TCP/IP four-layer conceptual model according to an embodiment of this application.
Figure 9B:
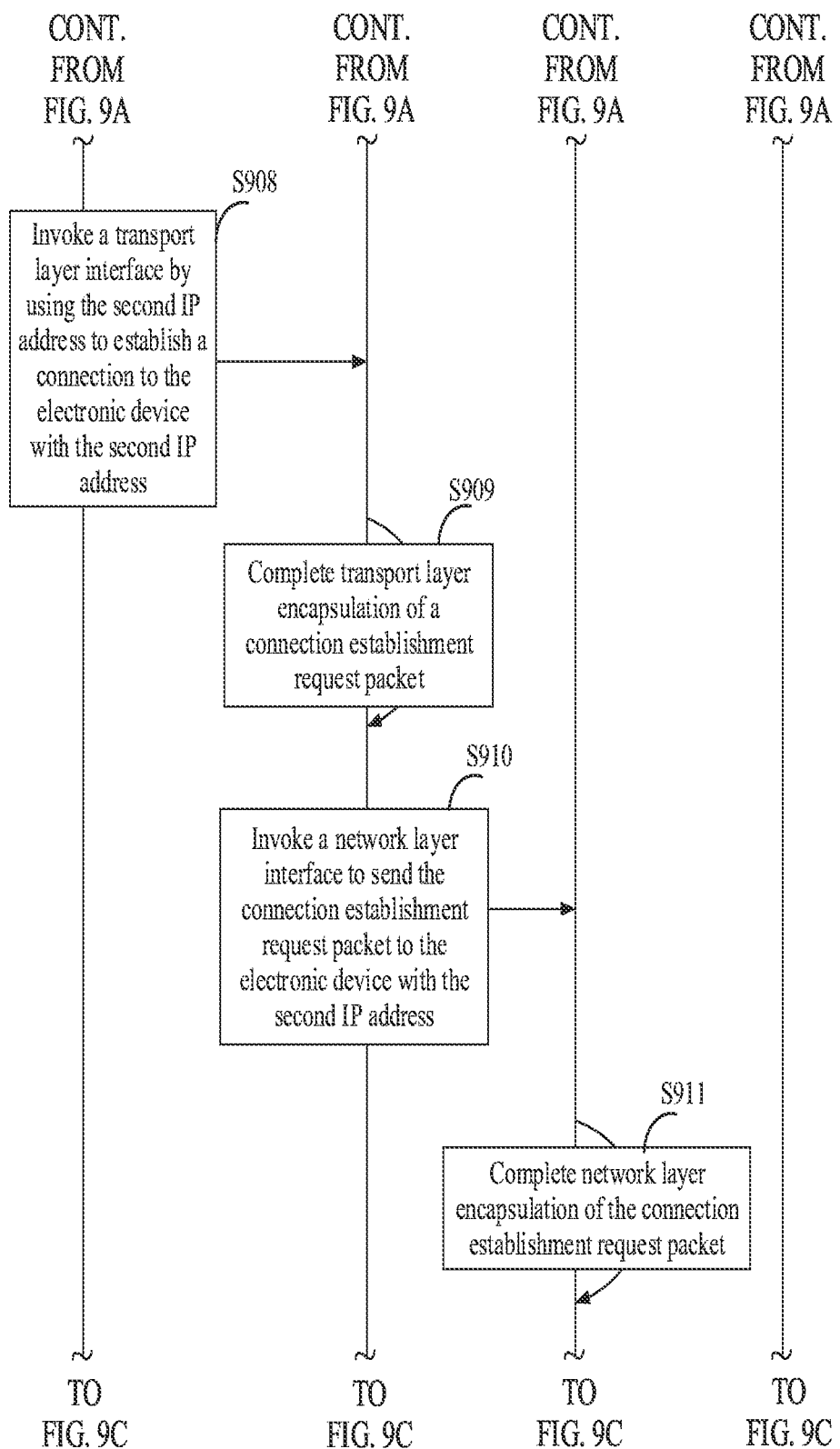
Figure 9C:
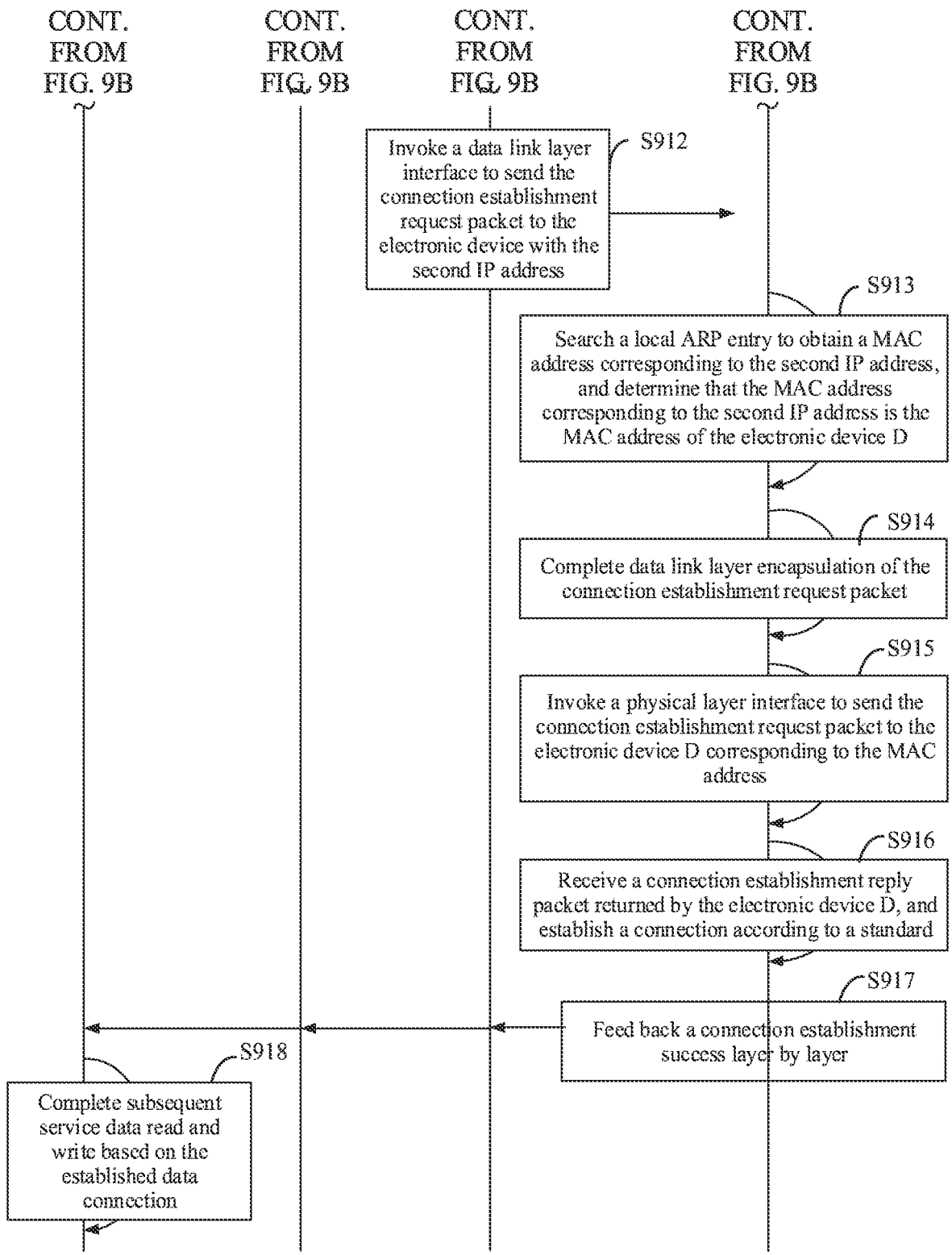

FIG. 9A to FIG. 9C are an example schematic diagram of signaling interaction of an electronic device in the TCP/IP four-layer conceptual model according to an embodiment of this application.

The signaling interaction process is divided into three phases:

A phase 1 is steps S901 and S902: An application layer of the electronic device A is invoked by an application to read a file in the electronic device D, and the electronic device A invokes a DRARP interface at the application layer to obtain a latest IP address of the electronic device D.

A phase 2 is steps S903 to S908, and is operations performed by the electronic device A at a data link layer to implement a function provided by the DRARP interface after the application layer of the electronic device A invokes the DRARP interface, and then return the latest IP address of the electronic device D to the application layer. The DRARP interface is a functional interface provided by a distributed reverse address resolution protocol in this embodiment of this application, and is configured to determine a latest IP address of an electronic device at the data link layer based on input identification information of the electronic device.

A phase 3 is steps S909 to S918, and is a process in which the application layer of the electronic device A establishes a communication connection to the electronic device D after obtaining the latest IP address of the electronic device D.

The following describes each step in each phase in detail.

Phase 1:

S901: An application layer interface of the electronic device A is invoked by the application A, to read a file in the electronic device D.

Optionally, the electronic device A may directly perform step S902 when being invoked by the application A to read the file in the electronic device D.

Figure 10A:
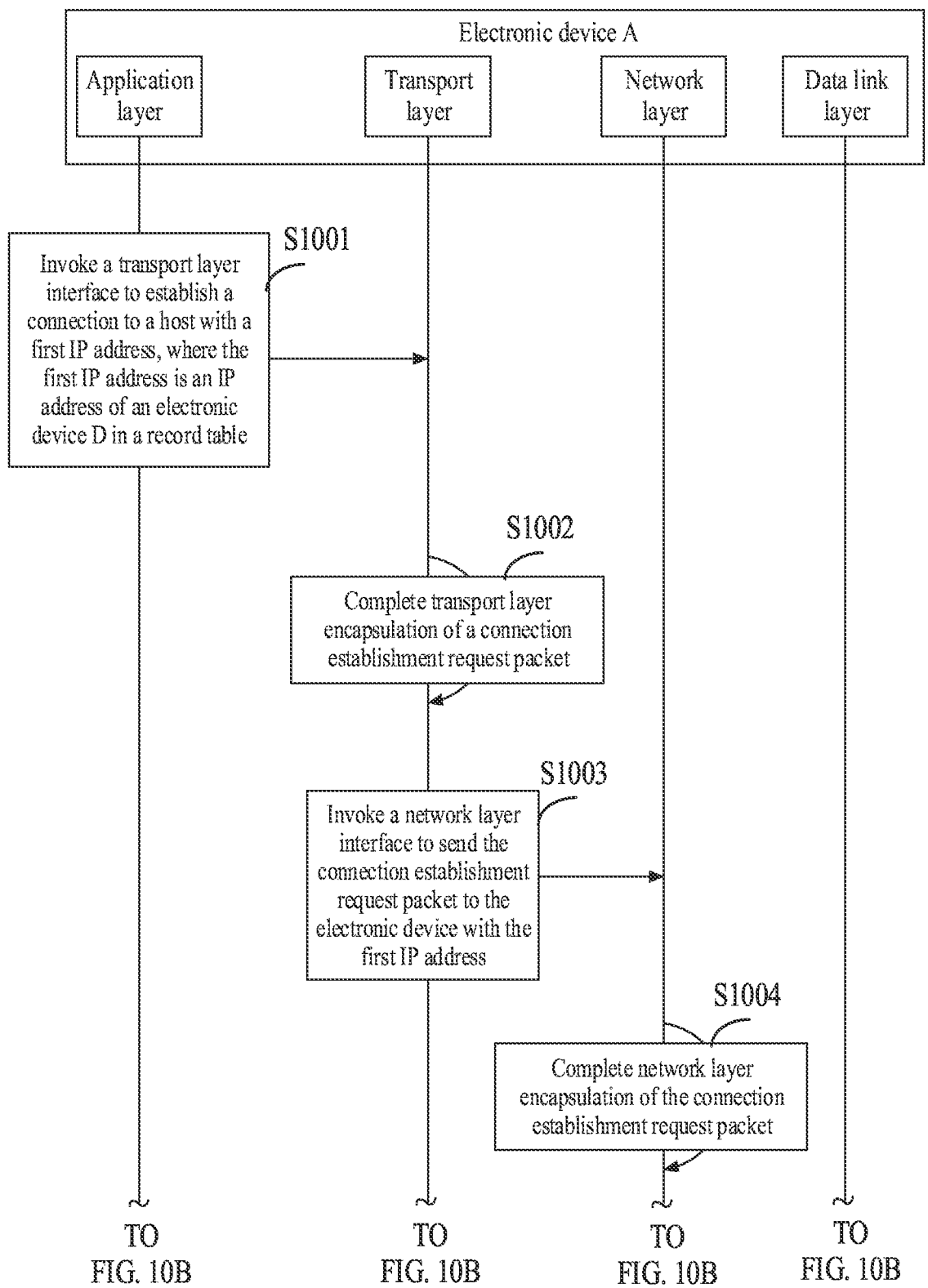
FIG. 10A and FIG. 10B are another example schematic diagram of signaling interaction of electronic devices in a TCP/IP four-layer conceptual model according to an embodiment of this application.
Figure 10B:
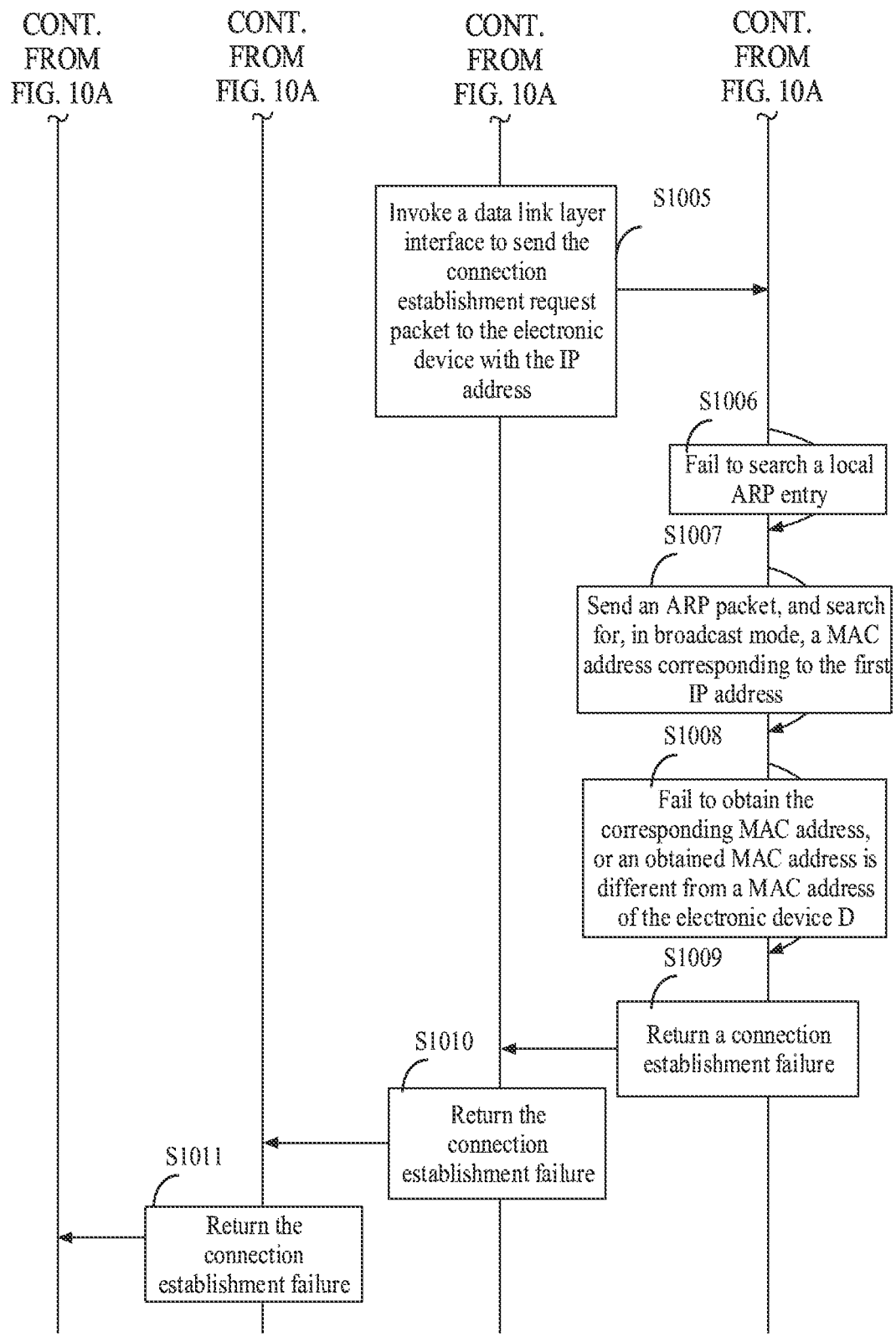

Optionally, the electronic device A may also store a record table at the application layer, to record a mapping between a MAC address and an IP address of an electronic device that has previously established a communication connection to the electronic device A. When the application layer of the electronic device A is invoked by the application A to read a file in the electronic device D, an IP address and a MAC address of the electronic device D that are recorded in the record table are first used to attempt to establish a connection to the electronic device D, and after the attempt fails, step S902 is performed. This is not limited herein. FIG. 10A and FIG. 10B are another example schematic diagram of signaling interaction of electronic devices in the TCP/IP four-layer conceptual model according to an embodiment of this application.

S1001: The application layer of the electronic device A invokes a transport layer interface to establish a communication connection to an electronic device with a first IP address, where the first IP address is an IP address that is of the electronic device D and that is recorded in the record table of the application layer of the electronic device A.

It may be understood that the first IP address is an IP address of the target electronic device that is recorded by the sender electronic device when the sender electronic device establishes a communication connection to the target electronic device last time, and the first IP address may also be referred to as a recorded IP address.

S1002: The electronic device A completes transport layer encapsulation of a connection establishment request packet at a transport layer.

S1003: The electronic device A invokes a network layer interface at the transport layer to send the connection establishment request packet to the electronic device with the first IP address.

S1004: The electronic device A completes network layer encapsulation of the connection establishment request packet at a network layer.

S1005: The electronic device A invokes a data link layer interface at the network layer to send the connection establishment request packet to the electronic device with the first IP address.

S1006: The electronic device A fails to search a local ARP entry at the data link layer.

In this embodiment of this application, a possible case in which the local ARP entry fails to be searched is as follows: Because the electronic device A has not established a communication connection to the electronic device D for a time period, the mapping record entry of the electronic device D in the local ARP entry has been aged and deleted.

If the electronic device A obtains a MAC address corresponding to the first IP address by searching the local ARP entry at the data link layer, but the MAC address corresponding to the first IP address is not a MAC address of the electronic device D, it indicates that the first IP address has been allocated to another electronic device, and the another electronic device has just established a communication connection to the electronic device A. The electronic device A may perform step S1008.

If the electronic device A obtains the MAC address corresponding to the first IP address by searching the local ARP entry at the data link layer, and the MAC address corresponding to the first IP address is a MAC address of the electronic device D, it indicates that the electronic device A has just established a communication connection to the electronic device D by using the first IP address, and the first IP address is the latest IP address of the electronic device D. The electronic device A may use the first IP address as a second IP address, and directly perform step S914. The second IP address is the latest IP address of the electronic device D.

Optionally, in actual application, after step S1006, step S1007 or S1008 may not be performed, and step S1009 is directly performed. This is not limited herein.

S1007: The electronic device A sends an ARP packet at the data link layer, and searches for, in broadcast mode, the MAC address corresponding to the first IP address.

After failing to search the local APR entry, the electronic device A may send the ARP packet at the data link layer to search for, in broadcast mode, the MAC address corresponding to the first IP address.

S1008: The electronic device A fails to obtain the MAC address corresponding to the first IP address, or an obtained MAC address is different from the MAC address of the electronic device D.

If the first IP address is not allocated by a gateway server, after sending the ARP packet in the local area network, the electronic device A cannot obtain the MAC address corresponding to the first IP address. If the first IP address is allocated by the gateway server to another electronic device C in the local area network, after sending the ARP packet in the local area network, the electronic device A obtains a MAC address of the electronic device C, and the electronic device A can determine that the obtained MAC address of the electronic device C is different from the MAC address of the electronic device D with which the electronic device A needs to communicate. The electronic device A may perform step S1009.

If the electronic device A obtains the MAC address corresponding to the first IP address, and the MAC address is the MAC address of the electronic device D, the electronic device A may use the first IP address as the second IP address, and directly perform step S914.

S1009: The electronic device A returns, at the data link layer, a connection establishment failure message to the network layer.

S1010: The electronic device A returns, at the network layer, the connection establishment failure message to the transport layer.

S1011: The electronic device A returns, at the transport layer, the connection establishment failure message to the application layer.

After the electronic device A receives the connection establishment failure message at the application layer, in the conventional technology, the electronic device A can only stop a communication process, or obtain, through a plurality of interactions at the application layer, the IP address of the electronic device D from a server of an application jointly run by the electronic device A and the electronic device D, and then reestablish a connection.

In this embodiment of this application, after receiving the connection establishment failure message at the application layer, the electronic device A may directly perform step S902 without relying on the server, to obtain the IP address of the electronic device D at the data link layer.

S902: The electronic device A invokes the DRARP interface at the application layer to obtain the second IP address, where the second IP address is a latest IP address of the electronic device D.

The DRARP interface is an interface provided by the distributed reverse address resolution protocol in the software architecture shown in FIG. 8, and identification information of an electronic device may be input to the DRARP interface to obtain a latest IP address of the electronic device.

Because the distributed reverse address resolution protocol works at the data link layer, after the electronic device A invokes the DRARP interface at the application layer, the electronic device A starts to perform subsequent work at the data link layer.

It may be understood that identification information of the electronic device D is carried when the electronic device A invokes the DRARP interface to obtain the IP address of the electronic device D. The identification information of the electronic device D may be a device name of the electronic device D, a device identifier of the electronic device D, the MAC address of the electronic device D, or the like. This is not limited herein.

Phase 2:

In the phase 2, the electronic device A may first perform step S903 to determine that a local DRARP entry does not include the second IP address, and then perform steps S905 to S907 to obtain the second IP address by using a DRARP interaction process. Alternatively, the electronic device A may directly perform steps S905 to S907 after step S902. This is not limited herein.

The following describes the steps in the phase 2.

S903: The electronic device A searches the local DRARP entry at the data link layer, to determine whether the second IP address exists.

After the electronic device A invokes the DRARP interface at the application layer to obtain the second IP address, the electronic device A may first search the local DRARP entry at the data link layer, to determine whether the second IP address exists.

Specifically, the electronic device A may determine whether the local DRARP entry includes an unaged mapping entry including the IP address of the target electronic device. An aged mapping entry is invalid, and an unaged mapping entry is valid.

Optionally, the electronic device A may determine whether a mapping entry including the MAC address of the electronic device D in the local DRARP entry is aged.

If the mapping entry including the MAC address of the electronic device D is not aged, it indicates that the local DRARP entry includes an unaged mapping entry including the IP address of the target electronic device. That is, the local DRARP entry includes the latest IP address of the electronic device D, that is, the second IP address.

If the mapping entry including the MAC address of the electronic device D is aged, it indicates that the local DRARP entry does not include an unaged mapping entry including the IP address of the target electronic device. That is, the local DRARP entry does not include the latest IP address of the electronic device D, that is, the second IP address.

It may be understood that the identification information of the electronic device D is carried when the electronic device A invokes the DRARP interface to obtain the second IP address.

Optionally, if the identification information of the electronic device D is the MAC address of the electronic device D, the electronic device A may directly search the local DRARP entry based on the MAC address of the electronic device D.

Optionally, if the identification information of the electronic device D is not the MAC address of the electronic device D, but another device identifier, for example, the device name of the electronic device D, a mapping entry in the local DRARP entry may further include the device identifier of the electronic device D. The electronic device A may determine whether the second IP address exists by determining whether the mapping entry including the device identifier of the electronic device D in the local DRARP entry is aged.

Optionally, if the identification information of the electronic device D is not the MAC address of the electronic device D, but another device identifier, for example, the device name of the electronic device D, before searching the local DRARP entry at the data link layer, the electronic device A may first search a device information table of the electronic device A based on the device identifier of the electronic device D, to obtain the MAC address of the electronic device D. The device information table may include a mapping between the identification information of the electronic device D and the MAC address of the electronic device D.

S904: When determining that the second IP address exists, the electronic device A returns, at the data link layer, the second IP address to the application layer.

When the electronic device A determines, by searching the local DRARP entry, that the local DRARP entry includes the second IP address, the electronic device A returns the second IP address to the application layer at the data link layer.

S905: The electronic device A initiates a DRARP interaction process at the data link layer, and obtains the second IP address based on the MAC address of the electronic device D.

When the electronic device A invokes the DRARP interface at the application layer to obtain the second IP address, or when the electronic device A determines, by searching the local DRARP entry at the data link layer, that the second IP address does not exist, the electronic device A may initiate the DRARP interaction process at the data link layer, and obtain the second IP address based on the MAC address of the electronic device D.

Figure 11:
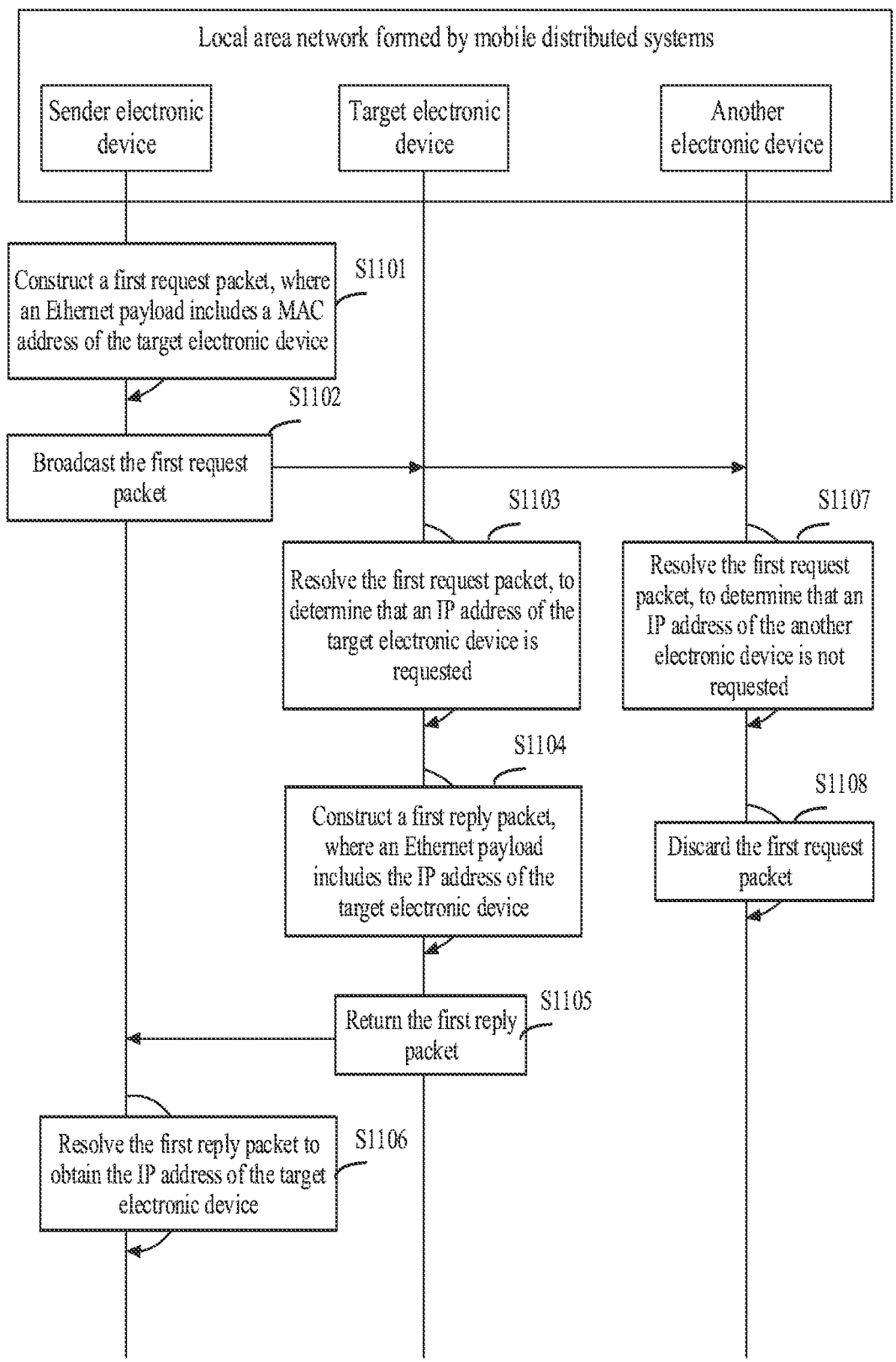
FIG. 11 is a schematic diagram of signaling interaction of a reverse address resolution method according to an embodiment of this application.

Specifically, the DRARP interaction process initiated by the electronic device A at the data link layer may be shown in FIG. 11. FIG. 11 is a schematic diagram of signaling interaction of a reverse address resolution method according to an embodiment of this application. The electronic device A is a sender electronic device, and the electronic device D is a target electronic device.

S1101: The sender electronic device constructs a first request packet.

An Ethernet payload of the first request packet includes a MAC address of the target electronic device. The first request packet is used to request the target electronic device to reply with an IP address of the target electronic device.

A first reply packet replies to the first request packet. The first reply packet is used to reply to the first request packet. An Ethernet payload of the first reply packet includes the IP address of the target electronic device.

Both the first request packet and the first reply packet may be data frames at the data link layer. Because the first request packet is a broadcast data packet, an Ethernet header of the first request packet includes an Ethernet broadcast address. The first reply packet replies to the first request packet. Therefore, the first reply packet needs to be sent to only the sender electronic device, and an Ethernet header of the first reply packet includes a MAC address of the sender electronic device.

To help another electronic device reply to the first request packet, the Ethernet payload of the first request packet may further include an IP address and the MAC address of the sender electronic device. To help the sender electronic device check whether the received first reply packet is correct, the Ethernet payload of the first reply packet may further include the MAC address of the target electronic device.

Optionally, the Ethernet header or the Ethernet payload of the first request packet carries a request identifier, and the request identifier is used to indicate that the first request packet is used to request the IP address of the target electronic device based on the MAC address of the target electronic device. Correspondingly, the Ethernet header or the Ethernet payload of the first reply packet may also carry a reply identifier, and the reply identifier is used to indicate that the first reply packet is used to reply to the first request packet.

It may be understood that the first request packet only needs to meet the foregoing requirement, and a specific form or a packet format of the first request packet is not limited. The first request packet may be a newly defined data packet, or may be a data packet obtained by modifying a data packet of an existing communications protocol. This is not limited herein.

Optionally, the Ethernet payload of the first request packet may carry only one MAC address of a target electronic device, or may carry a plurality of MAC addresses, or may be null. When there is only one MAC address of a target electronic device, if a MAC address of an electronic device is carried, it may indicate that only an IP address of the electronic device is requested; and if an Ethernet broadcast address of a network segment is carried, it may indicate that IP addresses of all electronic devices in the network segment are requested. When there are a plurality of MAC addresses of target electronic devices, it may indicate that all IP addresses of the plurality of electronic devices are requested. When the MAC address of the target electronic device is null, it may indicate that all electronic devices that receive the first request packet in the network are requested to reply with their own IP addresses. This is not limited herein.

Optionally, in the first request packet, different request identifiers may be used to distinguish whether an IP address/IP addresses of one electronic device, a plurality of electronic devices, or all electronic devices in the local area network are requested; or a same request identifier may be used to distinguish whether an IP address/IP addresses of one electronic device, a plurality of electronic devices, or all electronic devices in the local area network are requested based on only a quantity of MAC addresses and values of the MAC addresses carried in the first request packet. This is not limited herein. Correspondingly, in the first reply packet, different reply identifiers or a same reply identifier may be used to distinguish different types of first request packets that the first reply packet replies to. This is not limited herein.

Optionally, the request identifier may be located in the Ethernet header of the first request packet, or may be located in the Ethernet payload of the first request packet. This is not limited herein. The reply identifier may be located in the Ethernet header of the first reply packet, or may be in the Ethernet payload of the first reply packet. This is not limited herein.

Preferably, the first request packet may be obtained by modifying an ARP/RARP packet format in the TCP/IP protocol, and a requirement of the first request packet is met by redefining a value meaning of an existing field, extending a value range of the existing field, adding a new field, or the like in the ARP/RARP packet format.

Figure 12:
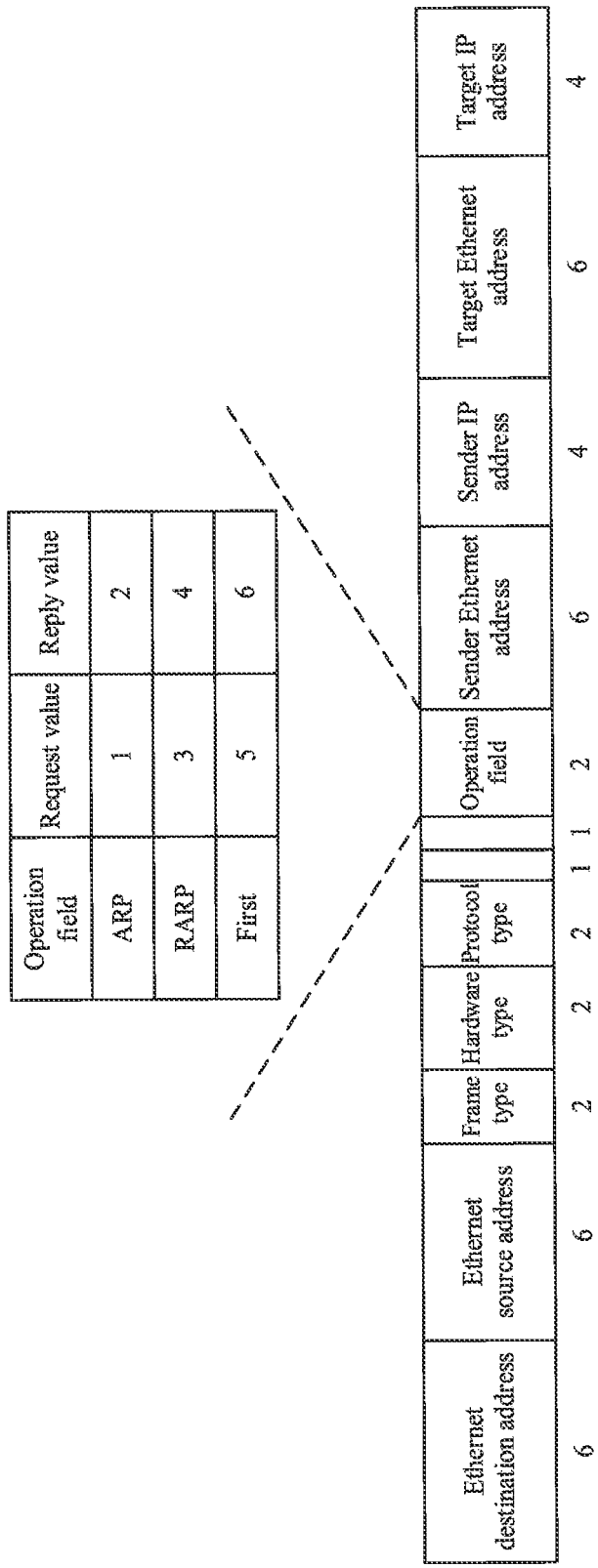
FIG. 12 is an example schematic diagram of a packet format of a first request packet and a first reply packet according to an embodiment of this application.

For example, in the manner of modifying the ARP/RARP packet format to meet the requirement of the first request packet, a value range and a value meaning of an existing field may be extended to obtain the first request packet. In some embodiments of this application, the operation field in the ARP/RARP packet format shown in FIG. 4 may be extended while the structure of the existing ARP/RARP packet format remains unchanged. FIG. 12 is an example schematic diagram of extending the RARP packet format to obtain a packet format of the first request packet and the first reply packet according to an embodiment of this application. The first reply packet is used to reply to the first request packet. A value 5 of the operation may be used as a request identifier, and may indicate that the data packet is the first request packet and is used to request an IP address according to a MAC address. A value 6 of the operation field may be used as a reply identifier, and may indicate that the data packet is the first reply packet and is used to reply to the first request packet. When a value of the operation field is 5 and the target Ethernet address field is a MAC address of a target electronic device, it may indicate that an IP address of the target electronic device is requested. When a value of the operation field is 5 and the target Ethernet address field is an all-1 broadcast MAC address, it may indicate that IP addresses of all electronic devices in the local area network are requested.

In addition to a manner of modifying a packet format of a data packet in an existing protocol to obtain the first request packet and the first reply packet, a new packet format may also be defined to obtain the first request packet and the first reply packet.

Figure 13:
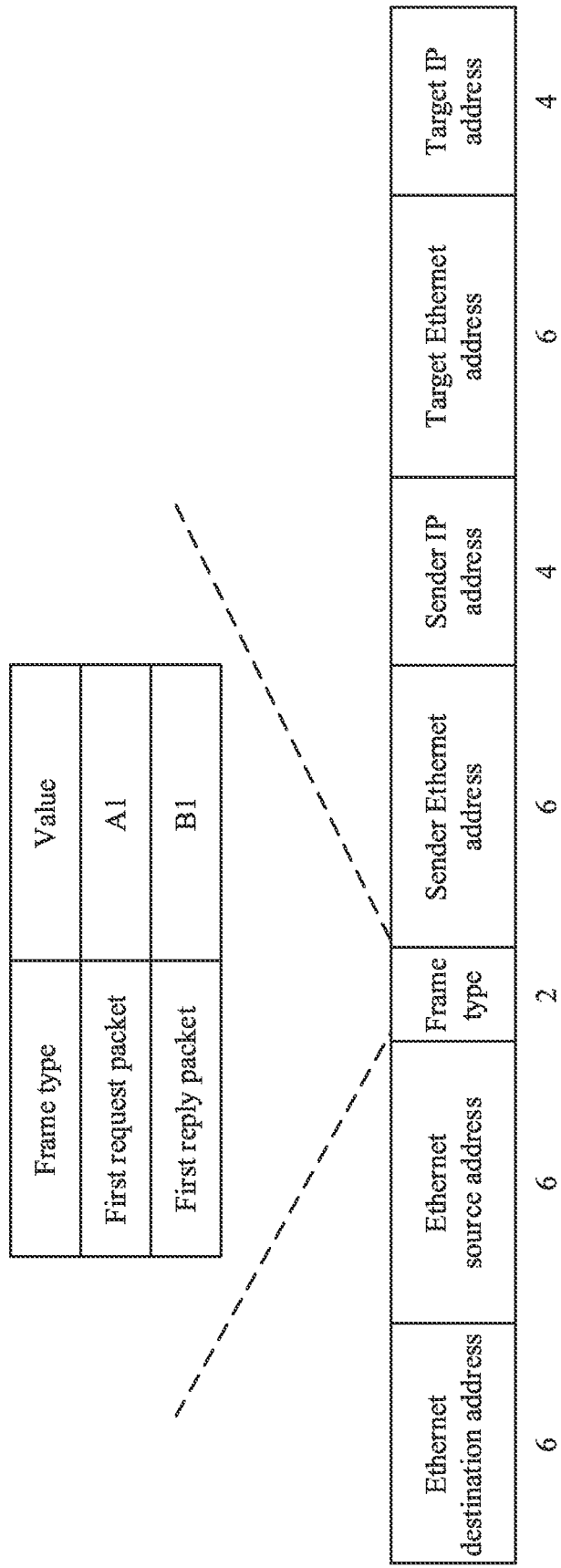
FIG. 13 is another example schematic diagram of a packet format of a first request packet and a first reply packet according to an embodiment of this application.

For example, FIG. 13 is an example schematic diagram of a redesigned packet format of the first request packet and the first reply packet according to an embodiment of this application. The packet format includes Ethernet destination address, Ethernet source address, frame type, sender Ethernet address, sender IP address, target Ethernet address, and target IP address fields. Definitions of the Ethernet destination address, Ethernet source address, sender Ethernet address, sender IP address, target Ethernet address, and target IP address fields may be the same as those defined in the ARP/RARP packet format, and details are not described herein again. A value of the frame type field may be redefined, and is used as a request identifier or a reply identifier, to indicate whether a type of the data packet is the first request packet or the first reply packet. For example, it may be defined that a value A1 of the frame type is used as a request identifier, and the data packet is the first request packet; and a value B1 of the frame type is used as a reply identifier, and the data packet is the first reply packet. Values of A1 and B1 are different, and do not conflict with values of existing frame types. When a value of the frame type field is A1 and the target Ethernet address field is a MAC address of a target electronic device, it may indicate that the MAC address of the target electronic device is requested. When a value of the frame type field is A1 and the target Ethernet address field is an all-1 broadcast MAC address, it may indicate that the IP addresses of all the electronic devices in the local area network are requested.

Figure 14:
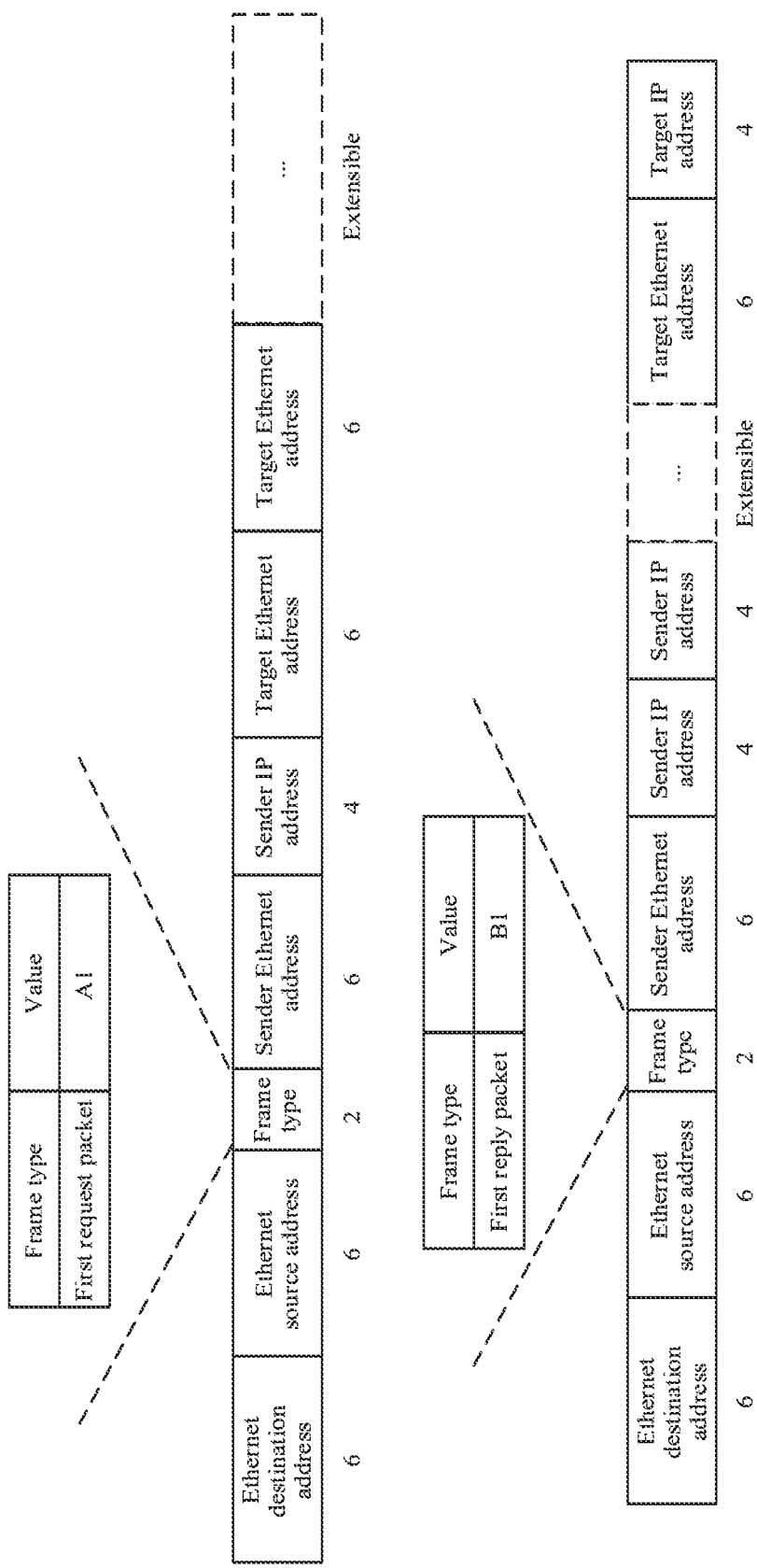
FIG. 14 is another example schematic diagram of packet formats of a first request packet and a first reply packet according to an embodiment of this application.

For example, the first request packet may carry a plurality of MAC addresses. FIG. 14 is another example schematic diagram of redesigned packet formats of the first request packet and the first reply packet according to an embodiment of this application. The packet format is an extensible format, and may carry a plurality of MAC addresses as required. A definition of each field is similar to a definition of a field in the packet format shown in FIG. 13, and details are not described herein again. A value A1 of the frame type is used as a request identifier. The first request packet may include a plurality of target Ethernet fields that may be extended as required. MAC addresses of a plurality of target electronic devices may be separately placed in the target Ethernet fields, indicating to request IP addresses of the plurality of electronic devices. A value B1 of the frame type is used as reply identifier. The first reply packet may include a plurality of sender IP address fields that may be extended as required. IP addresses of a plurality of electronic devices that reply to the first request packet are placed into the sender IP address fields.

Figure 15:
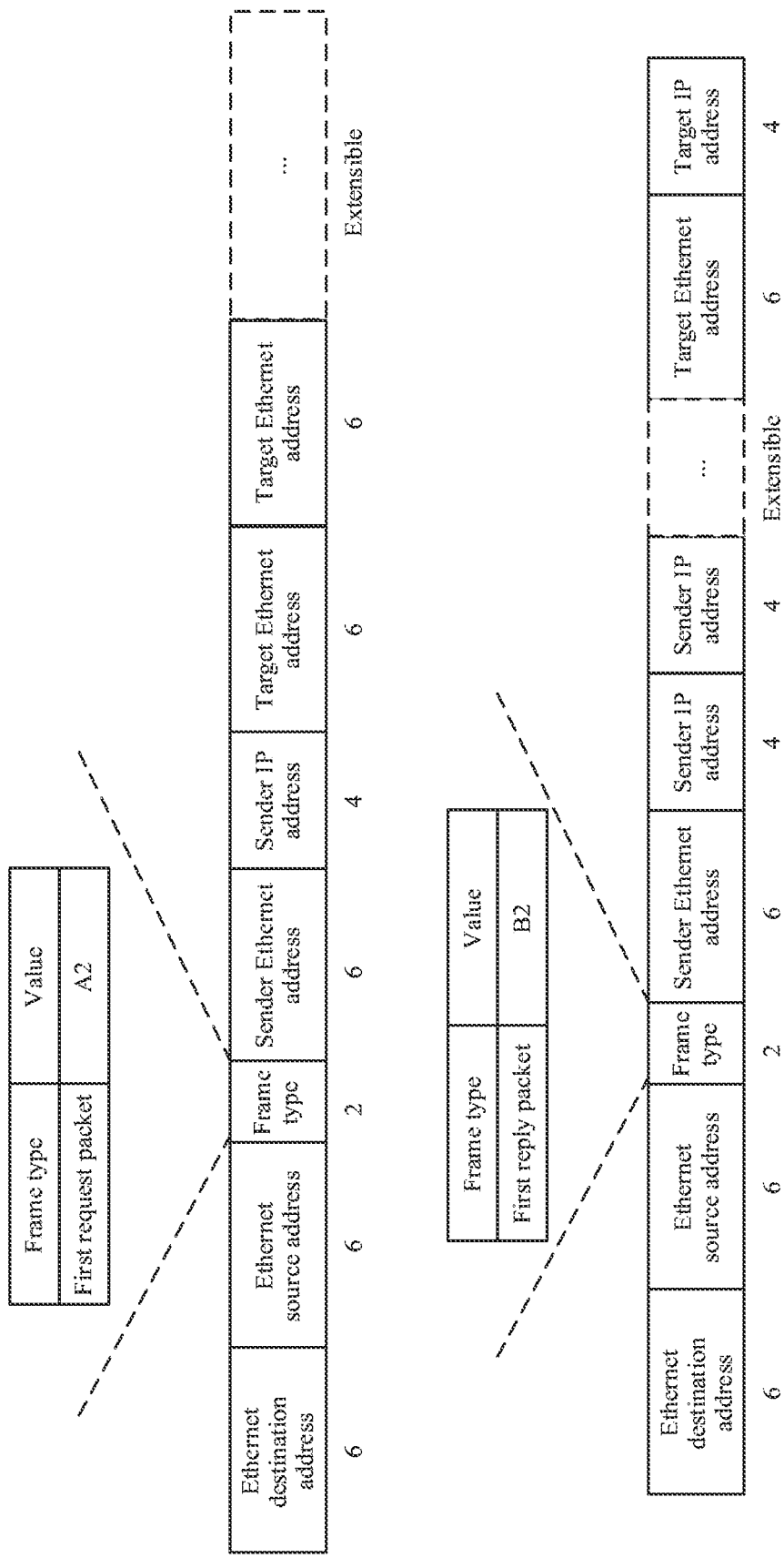
FIG. 15 is another example schematic diagram of packet formats of a first request packet and a first reply packet according to an embodiment of this application.

For example, in the first request packet, different request identifiers may be used to distinguish whether to request IP address/IP addresses of one electronic device, a plurality of electronic devices, or all the electronic devices in the local area network. FIG. 15 is another example schematic diagram of redesigned packet formats of the first request packet and the first reply packet according to an embodiment of this application. In the packet format, a value A2 of the frame type field may be used as a request identifier, to indicate that the first request packet is used to request IP addresses of a plurality of target electronic devices, and carries MAC addresses of the plurality of target electronic devices. A frame type field value different from that in the first request packet that carries only one MAC address shown in FIG. 13 is used. That is, a different request identifier is used. Similarly, a value B2 of the frame type field may be used as reply identifier, to indicate that the first reply packet carries IP addresses of a plurality of target electronic devices. A frame type field value different from that in the first reply packet that carries only an IP address of one target electronic device shown in FIG. 13 is used.

Figure 16:
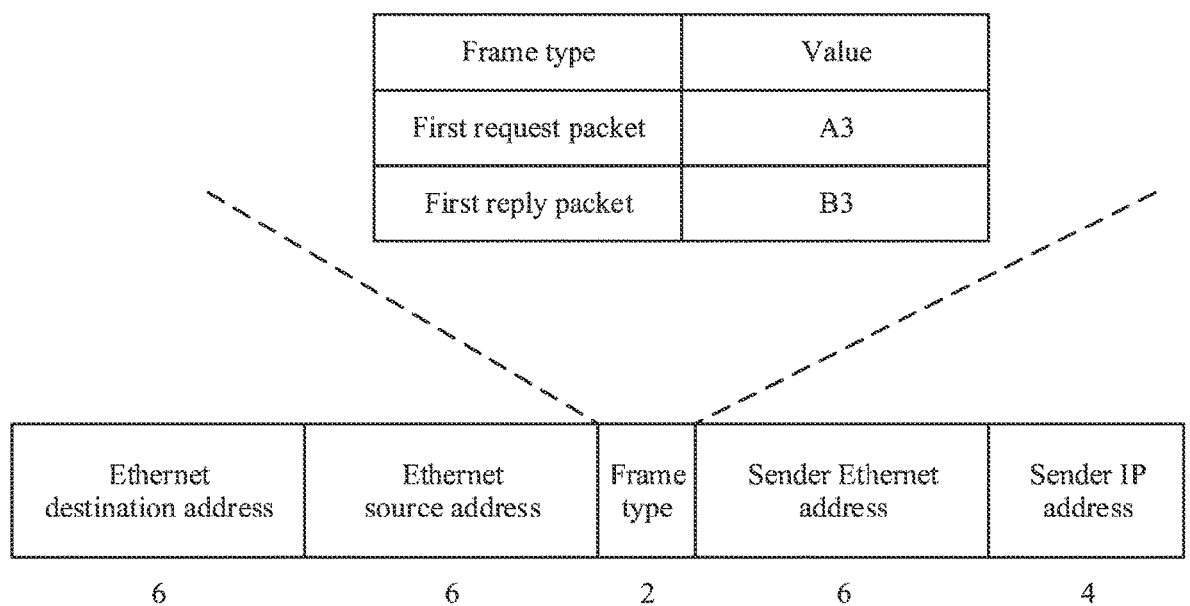
FIG. 16 is another example schematic diagram of a packet format of a first request packet and a first reply packet according to an embodiment of this application.

For example, the first request packet may carry an empty MAC address of a target electronic device, to indicate to request IP addresses of all other electronic devices in the local area network. FIG. 16 is another example schematic diagram of a redesigned packet format of the first request packet and the first reply packet according to an embodiment of this application. In the packet format, a value A3 of the frame type field may be used as a request identifier, to indicate that the first request packet is used to request the IP addresses of all the other electronic devices in the local area network, and carries an empty MAC address of a target electronic device. A frame type field value different from those in the first request packet that carries only one MAC address shown in FIG. 13 and the first request packet that carries a plurality of MAC addresses shown in FIG. 14 is used. That is, a different request identifier is used. Similarly, a value B3 of the frame type field may be used as a reply identifier, to indicate that the first reply packet is used to reply to the first request packet for requesting the IP addresses of all the other electronic devices in the local area network.

It may be understood that there are merely some examples of designing the packet formats of the first request packet and the first reply packet, and there may be a plurality of other manners of designing the packet formats of the first request packet and the first reply packet. This is not limited herein.

Optionally, in another embodiment of this application, if the first request packet is used to request the IP addresses of all the other electronic devices in the local area network, the first request packet may be not only used to obtain the IP addresses of the other electronic devices, but also used as a data packet for determining online information of the other electronic devices in the local area network. When receiving a first reply packet returned by another electronic device, the sender electronic device may refresh a recorded online status of the target electronic device to online. The online status of the target electronic device being online indicates that the target electronic device is in a state in which a communication connection to the target electronic device can be established. In addition, the sender electronic device may refresh an online status of an electronic device that does not reply with a first reply packet to offline. An online status of an electronic device being offline indicates that the electronic device is in a state in which a communication connection to the electronic device cannot be established. Therefore, the DRARP interface provided by the distributed reverse address resolution protocol in the software architecture shown in FIG. 8 may further implement a function of feeding back an online status of an electronic device in the local area network by invocation.

S1102: The sender electronic device broadcasts the first request packet in the network.

After constructing the first request packet, the sender electronic device broadcasts the first request packet in the network by using the data link layer.

It may be understood that, generally, the sender electronic device broadcasts the first request packet in the local area network in which the sender electronic device is located. Broadcasting the first request packet may enable all other electronic devices in the local area network to receive the first request packet. Generally, if a data packet needs to be broadcast, a destination MAC address of the data packet may be set to all 1s.

Optionally, the sender electronic device may alternatively broadcast the first request packet in a local area network in which the sender electronic device is not located. In this case, a gateway server is required for proxy forwarding. Specifically, in another embodiment of this application, when the sender electronic device and the target electronic device are not in a same local area network, according to a stipulation of the distributed reverse address resolution protocol, after receiving the first request packet, the gateway sewer in the local area network may forward, as a proxy, the first request packet to another local area network connected to the gateway sewer. After receiving the first reply packet fed back by the target electronic device located in the another local area network, the gateway server may forward, as a proxy, the first reply packet to the sender electronic device.

Optionally, the Ethernet header or the Ethernet payload of the first request packet may include a proxy forwarding identifier indicating whether the gateway server needs to forward the first request packet as a proxy. In an example of the packet format of the first request packet and the first reply packet shown in FIG. 13, the frame type field of the packet format may further include values A4 and B4, which are respectively used as the proxy forwarding identifiers in the first request packet and the first reply packet. The A4 value of the frame type field is used as a proxy forwarding identifier of the first request packet, to indicate that the first request packet is a request packet that needs to be forwarded by the gateway server as a proxy. Similarly, when a value of the frame type field is B4, the frame type field is used as a proxy forwarding identifier of the first reply packet, to indicate that the first reply packet is a reply packet that needs to be forwarded by the gateway server as a proxy. Otherwise, if the first request packet or the first reply packet does not include the proxy forwarding identifier that indicates that the first request packet or the first reply packet needs to be forwarded by the gateway server as a proxy, the gateway sewer may not forward the first request packet or the first reply packet. It may be understood that the first request packet or the first reply packet may further have many manners of indicating the proxy forwarding identifier. For example, a proxy identifier field may be added, and different values are used in the proxy identifier field to indicate whether the first request packet or the first reply packet needs to be forwarded by the gateway server as a proxy. This is not limited herein.

S1103: After receiving the first request packet, the target electronic device resolves the first request packet, to determine that the first request packet is used to request the IP address of the target electronic device.

After the sender electronic device broadcasts the first request packet in the local area network, all the other electronic devices including the target electronic device in the local area network receive the first request packet. After receiving the first request packet, the target electronic device resolves the first request packet, to determine that the first request packet is used to request the IP address of the target electronic device.

Specifically, after resolving the first request packet, the target electronic device may determine, based on the request identifier in the first request packet, that the first request packet is used to request an IP address. Then, the target electronic device may determine, based on the MAC address of the target electronic device included in the Ethernet payload of the first request packet, that the MAC address is the same as the MAC address of the target electronic device, to determine that the first request packet is used to request the IP address of the target electronic device.

It may be understood that if the first request packet carries a plurality of MAC addresses, the target electronic device may determine that the first request packet is used to request the IP address of the target electronic device as long as one MAC address is the same as the MAC address of the target electronic device. If the first request packet carries an Ethernet broadcast address or an empty MAC address, it indicates that the IP addresses of all the electronic devices in the local area network are requested, and the target electronic device may also determine that the first request packet is used to request the IP address of the target electronic device.

For example, if the received first request packet is the first request packet shown in FIG. 12, after resolving the first request packet, the target electronic device obtains an operation field value 6, and may determine that the received first request packet is used to request an IP address. The target electronic device may further learn that a value of the target Ethernet address field is the same as the MAC address of the target electronic device, and may determine that the first request packet is used to request the IP address of the target electronic device.

S1104: The target electronic device constructs the first reply packet.

After determining that the received first request packet is used to request the IP address of the target electronic device, the target electronic device constructs the first reply packet. For descriptions of the first reply packet, refer to S1101. Details are not described herein again.

It may be understood that the first reply packet only needs to meet the requirement of the first reply packet described in S1101, and a specific form or a packet format of the first reply packet is not limited. The first reply packet may be a newly defined data packet, or may be a data packet obtained by modifying a data packet of an existing communications protocol. This is not limited herein.

Preferably, the first reply packet may be obtained by modifying an ARP/RARP packet format in the TCP/IP protocol, and a requirement of the first reply packet is met by redefining a value meaning of an existing field, extending a value range of the existing field, adding a new field, or the like in the ARP/RARP packet format.

For example, in the manner of modifying the ARP/RARP packet format to meet the requirement of the first reply packet, as shown in FIG. 12, a value 6 of the operation field is used as a reply identifier, and may indicate that the data packet is the first reply packet and is used to reply to the first request packet.

For example, in the manner of redesigning a packet format to meet the requirement of the first reply packet, as shown in FIG. 13, a value B1 of the frame type field is used as a reply identifier, and may indicate that the data packet is the first reply packet and is used to reply to the first request packet.

For example, if there are a plurality of IP addresses of the target electronic devices, all the IP addresses may be replied in the first reply packet. As shown in FIG. 14, in another manner of redesigning a packet format to meet the requirement of the first reply packet, a value B1 of the frame type field is used as a reply identifier, and may indicate that the data packet is the first reply packet. A plurality of sender IP address fields may be in the first reply packet and may be extended as required, and a plurality of IP addresses of target electronic devices may be carried in the sender IP address fields.

For example, the first reply packet may include different reply identifiers to respectively indicate replies to a first request packet that requests an IP address of one electronic device, IP addresses of a plurality of electronic devices, or the IP addresses of all the electronic devices in the local area network. As shown in FIG. 16, in the manner of redesigning a packet format to meet the requirement of the first reply packet, the first reply packet whose frame type field value is B3 may be used to reply to the first request packet that requests the IP addresses of all the electronic devices in the local area network.

It may be understood that specific packet formats of the first request packet and the first reply packet may be specified in the distributed reverse address resolution protocol based on an actual requirement. This embodiment of this application is merely an example, and is not limited herein.

S1105: The target electronic device returns the first reply packet to the sender electronic device.

After constructing the first reply packet, the target electronic device may return the first reply packet to the sender electronic device. Because the target electronic device has received the first request packet sent by the sender electronic device, the target electronic device can determine the IP address and the MAC address of the sender electronic device. Therefore, to save signaling resources, the target electronic device may reply with the first reply packet in a unicast manner, and send the first reply packet only to the sender electronic device, without using a broadcast manner.

S1106: The sender electronic device resolves the first reply packet to obtain the IP address of the target electronic device.

After receiving the first reply packet returned by the target electronic device, the sender electronic device may resolve the first reply packet to obtain the IP address of the target electronic device.

After obtaining the IP address of the target electronic device, the sender electronic device may continue to establish a communication connection to the target electronic device based on the IP address and the MAC address of the target electronic device.

After obtaining the IP address of the target electronic device, the sender electronic device may store the IP address of the target electronic device. Optionally, the sender electronic device may update a local ARP entry, and record a mapping between the MAC address of the target electronic device and the IP address of the target electronic device in the local ARP entry. Optionally, the sender electronic device may update a local DRARP entry, and record a mapping between the MAC address of the target electronic device and the IP address of the target electronic device in the local DRARP entry. Optionally, the sender electronic device may update a local record table at the application layer, and record a mapping between the target electronic device and the IP address of the target electronic device in the record table. The sender electronic device may further store the IP address of the target electronic device in another required location. This is not limited herein.

S1107: After receiving the first request packet, another electronic device in the local area network resolves the first request packet, to determine that an IP address of the another electronic device is not requested.

After the sender electronic device broadcasts the first request packet in the local area network in step S1102, the another electronic device in the local area network also receives the first request packet. After receiving the first request packet, the another electronic device resolves the first request packet, to determine that the first request packet is not used to request the IP address of the another electronic device.

Specifically, after resolving the first request packet, the another electronic device may determine, based on the identifier indicating that the first request packet requests the IP address of the target electronic device, that the first request packet is used to request an IP address. The another electronic device may further determine, based on the carried MAC address of the target electronic device, that the MAC address is different from a MAC address of the another electronic device, to determine that the first request packet is not used to request the IP address of the another electronic device.

S1108: The another electronic device discards the first request packet.

When the another electronic device in the local area network determines that the received first request packet is not used to request the IP address of the another electronic device, the another electronic device discards the first request packet.

In this embodiment of this application, in the local area network formed by the mobile distributed system, when the sender electronic device knows the MAC address of the target electronic device but does not know the IP address of the target electronic device, the sender electronic device may broadcast, at the data link layer, the first request packet carrying the MAC address of the target electronic device in the local area network. After receiving the first request packet, when resolving the first request packet to determine that the IP address of the target electronic device is requested, the target electronic device sends the first reply packet carrying the IP address of the target electronic device to the sender electronic device. The sender electronic device may resolve the first reply packet to obtain the IP address of the target electronic device. Therefore, in the distributed system, the IP address of the target electronic device is quickly obtained without support of a sewer.

In the DRARP interaction process shown in FIG. 11, the electronic device A may obtain the latest IP address of the electronic device D based on the MAC address of the electronic device D.

The following describes the reverse address resolution method shown in FIG. 11 with reference to a specific application scenario.

Figure 17:
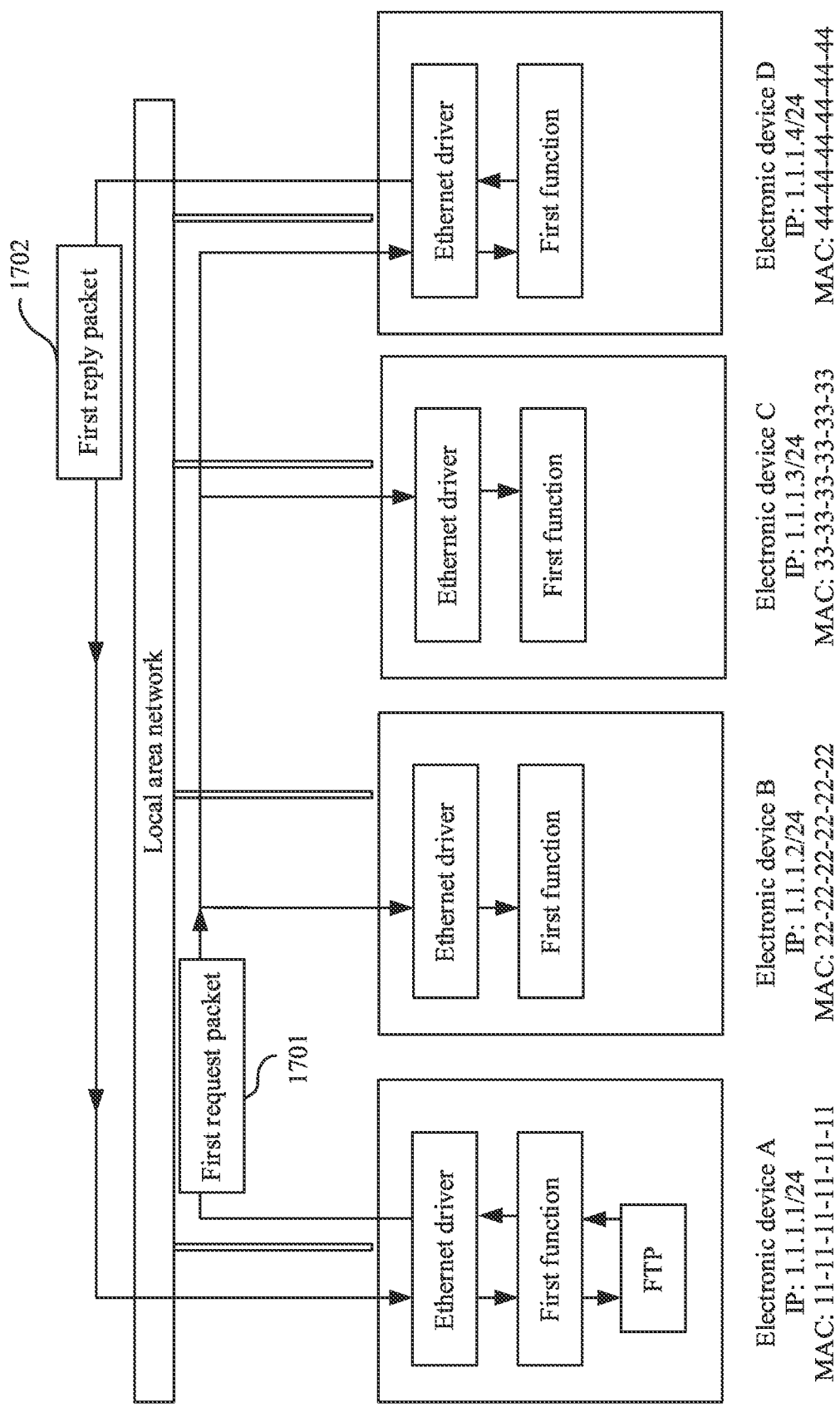
FIG. 17 is an example schematic diagram of information flow interaction in a reverse address resolution method according to an embodiment of this application.

FIG. 17 is an example schematic diagram of information flow interaction in the reverse address resolution method according to an embodiment of this application.

It is assumed that packet formats of the first request packet and the first reply packet are obtained by extending the RARP packet format shown in FIG. 12. An electronic device A, an electronic device B, an electronic device C, and an electronic device D form a mobile distributed system. Each electronic device stores a first function used to construct and resolve the first request packet and the first reply packet. The electronic device D accesses the local area network again after leaving the local area network. Therefore, a local DRARP entry of the electronic device A records a MAC address of the electronic device D, but cannot determine a latest IP address of the electronic device D.

In this case, a file transfer protocol (File Transfer Protocol, FTP) application in the electronic device A needs to obtain a file from the electronic device D.

According to step S902 in the embodiment shown in FIG. 9A to FIG. 9C, when an application layer interface in the electronic device A is invoked by the FTP application to obtain a file from the electronic device D, the electronic device A invokes a DRARP interface at an application layer to obtain the latest IP address of the electronic device D.

According to step S905 in the embodiment shown in FIG. 9A to FIG. 9C, after the electronic device A invokes the DRARP interface at the application layer to input the MAC address 44-44-44-44-44-44 of the electronic device D, the electronic device A initiates a DRARP interaction process at a data link layer, and obtains the latest IP address 1.1.1.4 of the electronic device D based on the MAC address 44-44-44-44-44-44 of the electronic device D.

The DRARP interaction process may be specifically as follows:

According to step S1101 in the embodiment shown in FIG. 11, the electronic device A invokes the first function at the data link layer to construct a first request packet, where the first request packet includes the MAC address 44-44-44-44-44-44 of the electronic device D.

According to step S1102 in the embodiment shown in FIG. 11, the electronic device A broadcasts the first request packet, and sends, by using an Ethernet driver in the electronic device A, the first request packet 1701 to electronic devices in the local area network: the electronic device B, the electronic device C, and the electronic device D.

Figure 18:
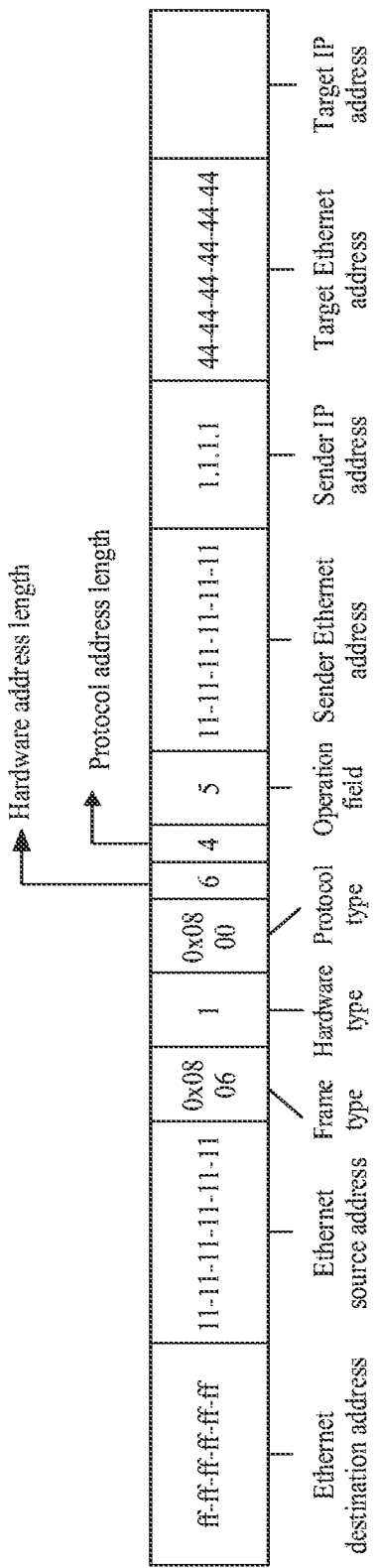
FIG. 18 is an example schematic diagram of a first request packet according to an embodiment of this application.

For example, FIG. 18 is an example schematic diagram of the first request packet 1701 according to an embodiment of this application. A value of an Ethernet destination address field is a hexadecimal value ff-ff-ff-ff-ff-ff, indicating a broadcast address with all 1s. A value of an Ethernet source address field is 11-11-11-11-11-11, and is a MAC address of the electronic device A that constructs the first request packet. A value of a frame type field is 0x0806, indicating that a type of subsequent data is an extension of an RARP request or reply message. A value of a hardware type field is 1, indicating that a type of a hardware address is an Ethernet address. A value of a protocol type field is 0x0800, indicating that a protocol address is an IP address. A value of a hardware address length is 6, and a value of a protocol address length is 4, which are respectively a length of a MAC address and a length of an Ethernet IP address. A value of an operation field is 5, indicating that the data packet is a first request packet, and is used to request the IP address of a target electronic device based on a MAC address of the target electronic device. A value of a sender Ethernet address field is 11-11-11-11-11-11, and is the MAC address of the electronic device A that sends the first request packet. A value of a sender IP address field is 1.1.1.1, and is an IP address of the electronic device A that sends the first request packet. A value of a target Ethernet address field is 44-44-44-44-44-44, and is a MAC address of a target electronic device whose IP address is requested by the first request packet, that is, the MAC address of the electronic device D. A value of a target IP address field is null.

According to step S1107 in the embodiment shown in FIG. 11, after receiving the first request packet 1701 by using an Ethernet driver, the electronic device B and the electronic device C invoke the first function 1001, to determine that the value of the operation field of the first request packet is 6, and the first request packet 1701 is used to request an IP address of a target electronic device. The electronic device B and the electronic device C determine that the value of the target Ethernet address field is 44-44-44-44-44-44, and is different from values of MAC addresses 22-22-22-22-22-22 and 33-33-33-33-33-33 of the electronic device B and the electronic device C. Therefore, the electronic device B and the electronic device C determine that the first request packet 1701 is not used to request IP addresses of the electronic device B and the electronic device C.

According to step S1108 in the embodiment shown in FIG. 11, the electronic device B and the electronic device C discard the first request packet 1701.

According to step S1103 in the embodiment shown in FIG. 11, after receiving the first request packet 1701 by using an Ethernet driver, the electronic device D invokes the first function to resolve the first request packet 1701, to determine that the value of the operation field of the first request packet is 6, and the first request packet 1701 is used to request an IP address of a target electronic device. The electronic device D determines that the value of the target Ethernet address field is 44-44-44-44-44-44, and is the same as the value 44-44-44-44-44-44 of the MAC address of the electronic device D. Therefore, the electronic device D determines that the first request packet 1701 is used to request the IP address of the electronic device D.

According to step S1104 in the embodiment shown in FIG. 11, the electronic device D invokes the first function to construct the first reply packet, and uses the first reply packet to carry the IP address 1.1.1.4 of the electronic device D.

According to step S1105 in the embodiment shown in FIG. 11, the electronic device D sends the first reply packet 1702 to the electronic device A by using the Ethernet driver.

Figure 19:
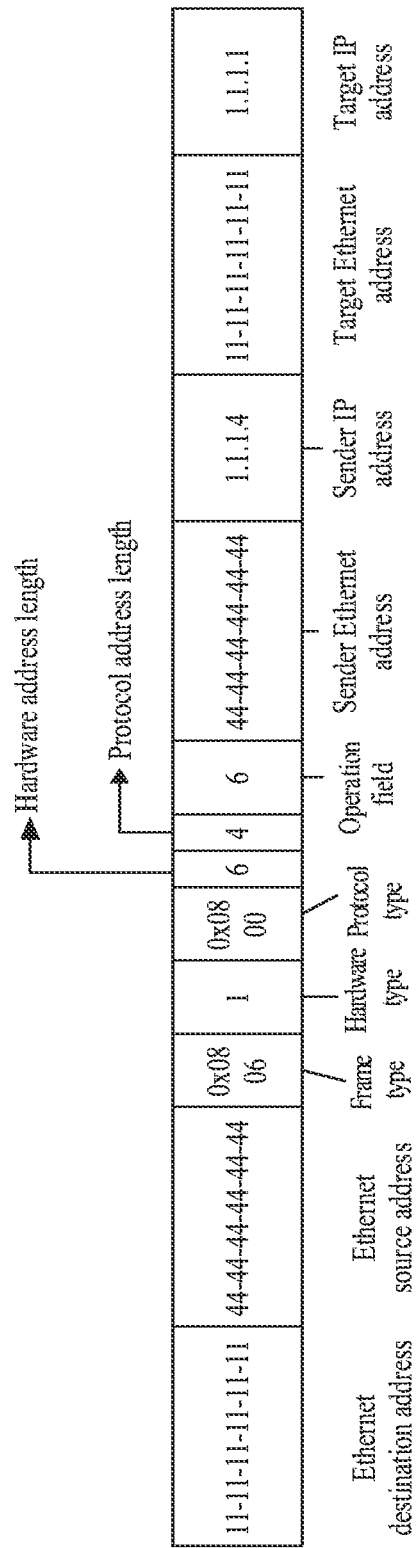
FIG. 19 is an example schematic diagram of a first reply packet according to an embodiment of this application.

For example, FIG. 19 is an example schematic diagram of the first reply packet 1702 according to an embodiment of this application. A value of an Ethernet destination address field is a hexadecimal value 11-11-11-11-11-11, and is the MAC address of the electronic device A that receives the first reply packet 1702. A value of an Ethernet source address field is 44-44-44-44-44-44, and is the MAC address of the electronic device D that constructs the first reply packet. A value of a frame type field is 0x0806, indicating that a type of subsequent data is an extension of an RARP request or reply message. A value of a hardware type field is 1, indicating that a type of a hardware address is an Ethernet address. A value of a protocol type field is 0x0800, indicating that a protocol address is an IP address. A value of a hardware address length is 6, and a value of a protocol address length is 4, which are respectively a length of a MAC address and a length of an Ethernet IP address. A value of an operation field is 6, indicating that the data packet is the first reply packet, and is used to reply with the IP address of the target electronic device based on the first request packet 1701. A value of a sender Ethernet address field is 44-44-44-44-44-44, and is the MAC address of the electronic device D that sends the first reply packet 1702. A value of a sender IP address field is 1.1.1.4, and is the IP address of the electronic device D that sends the first reply packet, that is, the IP address requested by the first request packet 1701. A value of a target Ethernet address field is 11-11-11-11-11-11, and is the MAC address of the electronic device A that receives the first reply packet 1702. A value of a target IP address field is 1.1.1.1, and is the IP address of the electronic device A that receives the first reply packet 1702.

According to step S1106 in the embodiment shown in FIG. 11, after receiving the first reply packet 1702 by using the Ethernet driver, the electronic device A invokes the first function to resolve the first reply packet 1702, so as to obtain the IP address 1.1.1.4 of the electronic device D.

Optionally, in another embodiment of this application, in step S905, the electronic device A initiates the DRARP interaction process at the data link layer, and obtains the second IP address based on the MAC address of the electronic device D. In actual application, in this case, the electronic device D may not be in the local area network in which the electronic device A is located, and the electronic device A cannot obtain the second IP address through the DRARP interaction process. In this case, the electronic device A may broadcast, again according to the DRARP interaction process shown in FIG. 11, the first request packet used to obtain the IP addresses of all the electronic devices in the local area network, determine currently online electronic devices in the local area network based on replied first reply packets, and obtain the IP addresses of all the online electronic devices in the local area network. For a specific process, refer to the description in the embodiment shown in FIG. 11. Details are not described herein again.

S906: The electronic device A updates the local DRARP entry at the data link layer, and records a mapping between the second IP address and the MAC address of the electronic device D.

S907: The electronic device A returns, at the data link layer, the second IP address to the application layer.

Phase 3:

S908: The electronic device A invokes the transport layer interface at the application layer by using the second IP address to establish a connection to the electronic device with the second IP address.

S909: The electronic device A completes transport layer encapsulation of a connection establishment request packet at the transport layer.

S910: The electronic device A invokes the network layer interface at the transport layer to send the connection establishment request packet to the electronic device with the second IP address.

S911: The electronic device A completes network layer encapsulation of the connection establishment request packet at the network layer.

S912: The electronic device A invokes the data link layer interface at the network layer to send the connection establishment request packet to the electronic device with the second IP address.

S913: The electronic device A searches the local ARP entry at the data link layer, and determines that the second IP address corresponds to the MAC address of the electronic device D.

It may be understood that, in step S905, when the electronic device A initiates the DRARP interaction process and receives the first reply packet returned by the electronic device D, according to the stipulation of the TCP/IP protocol, the electronic device A updates the local ARP entry, and records the mapping between the second IP address and the MAC address of the electronic device D. Therefore, in this case, the electronic device A may determine, by searching the local ARP entry at the data link layer, that the second IP address corresponds to the MAC address of the electronic device D.

S914: Complete data link layer encapsulation of the connection establishment request packet.

S915: The electronic device A invokes a physical layer interface at the data link layer to send the connection establishment request packet to the electronic device D corresponding to the MAC address.

S916: The electronic device A receives, at the data link layer, a connection establishment reply packet returned by the electronic device D, and establishes a connection to the electronic device D according to a standard.

S917: The electronic device A feeds back a connection establishment success layer by layer.

S918: The electronic device A completes subsequent service data read/write with the electronic device D at the application layer through the established data connection.

It may be understood that, after the electronic device A obtains the latest second IP address of the electronic device D, a process of establishing a connection between the electronic device A and the electronic device D in steps S908 to S918 in the phase 3 is similar to that in the conventional technology. Details are not described herein.

Case 2: The local DRARP entry records only the MAC address of the target electronic device.

In the case 1, the sender electronic device has communicated with the target electronic device, and the local DRARP entry of the sender electronic device records the IP address and the MAC address of the target electronic device.

In another case, the sender electronic device has not communicated with the target electronic device. However, after the target electronic device accesses the local area network, an electronic device or a server in the local area network broadcasts the MAC address of the target electronic device. Therefore, the local DRARP entry of the sender electronic device records the MAC address of the target electronic device.

Figure 20:
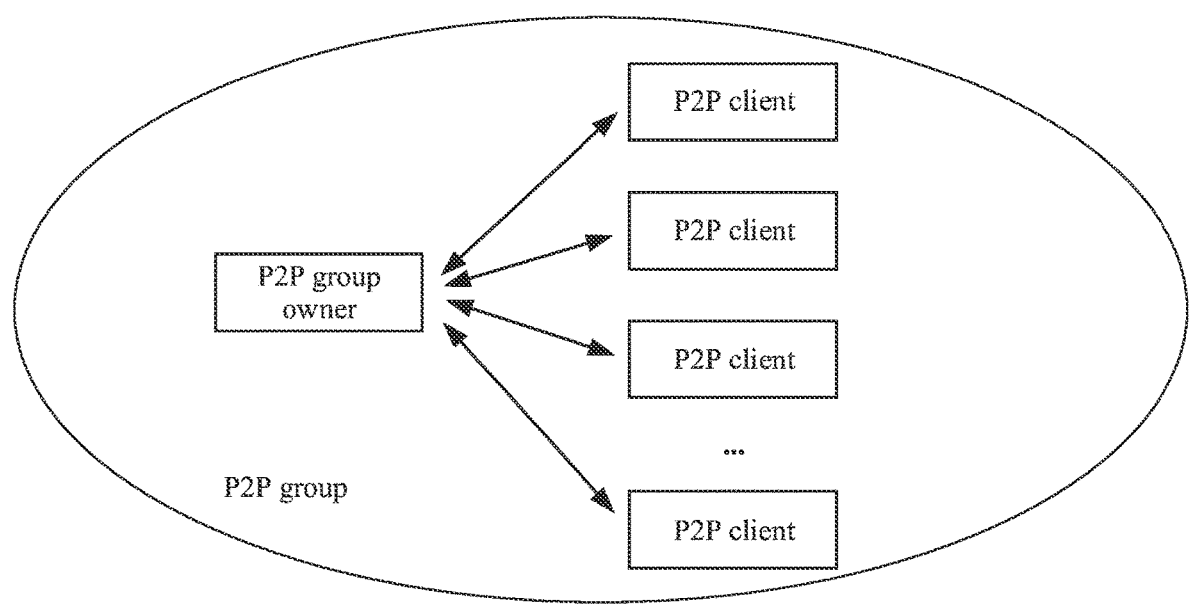
FIG. 20 is a schematic diagram of a P2P group scenario according to an embodiment of this application.

For example, electronic devices in the local area network form a P2P group by using the Wi-Fi P2P technology. FIG. 20 is a schematic diagram of a scenario of a P2P group. One electronic device is used as a P2P group owner, and other electronic devices are used as P2P clients. When a new electronic device joins the P2P group and becomes a new P2P client, the P2P group owner broadcasts a MAC address of the new P2P client to all other P2P clients in the P2P group.

In a case in which the local DRARP entry of the electronic device A records only the MAC address of the target electronic device, when the sender electronic device wants to read a file in the target electronic device, steps S901 to S918 may be performed by using an example in which the sender electronic device is the electronic device A and the target electronic device is the electronic device D. For specific step descriptions, refer to corresponding step descriptions in the embodiment shown in FIG. 9A to FIG. 9C. Details are not described herein again.

Case 3: There is no record of the MAC address of the target electronic device.

If the sender electronic device has no record of the MAC address of the target electronic device, the sender electronic device needs to interact for a plurality of times with a server of an application jointly run by the sender electronic device and the target electronic device at the application layer, to obtain the IP address and the MAC address of the target electronic device. Otherwise, the communication connection to the target electronic device cannot be established.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented through software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or a part of the procedure or functions according to embodiments of this application are generated. The computer may be a general-purpose computer, a dedicated computer, a computer network, or other programmable apparatuses. The computer instructions may be stored in the computer-readable storage medium or may be transmitted from a computer-readable storage medium to another computer-readable storage medium. For example, the computer instructions may be transmitted from a website, computer, sewer, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures in the methods in the foregoing embodiments may be implemented by a computer program instructing related hardware. The program may be stored in a computer-readable storage medium. When the program is run, the procedures of the methods in the foregoing embodiments are executed. The foregoing storage medium includes any medium that can store program code, such as a ROM, a random access memory RAM, a magnetic disk, or an optical disk.

What is claimed is:

1. A reverse address resolution method, comprising:
broadcasting, by a sender electronic device, a first request packet in a local area network, wherein the first request packet comprises a request identifier indicating that the first request packet is used to request an internet protocol (IP) address according to a media access control (MAC) address, a first proxy forwarding identifier indicating that a gateway server in the local area network needs to forward the first request packet as a proxy, and a first Ethernet payload with a MAC address associated with a target electronic device in the local area network;
receiving, by the sender electronic device, a first reply packet returned by the gateway server in the local area network, wherein the first reply packet comprises a second proxy forwarding identifier indicating that the gateway server in the local area network needs to forward the first reply packet as a proxy and a second Ethernet payload with an IP address of the target electronic device;
obtaining, by the sender electronic device, the IP address of the target electronic device from the first reply packet;
broadcasting, by the sender electronic device, a second request packet for requesting IP addresses of all electronic devices in the local area network, wherein the second request packet comprises a second request identifier, an Ethernet header with a broadcast MAC address and a third Ethernet payload, wherein the third Ethernet payload includes a target Ethernet address field with a value of null to indicate the IP addresses of all electronic devices are requested;
receiving, by the sender electronic device, multiple second reply packets returned by multiple electronic devices in the local area network, the multiple second reply packets including IP addresses of the multiple electronic devices; and
refreshing, by the sender electronic device, an online status of at least one of the multiple electronic devices to online and an online status of an electronic device that does not reply with a second reply packet to offline, wherein the online status of the at least one of the multiple electronic devices being online indicates that the at least one of the multiple electronic devices is in a state in which a communication connection to the at least one of the multiple electronic devices can be established, the online status of the electronic device being offline indicates that the electronic device is in a state in which a communication connection to the electronic devices can't be established.

2. The method according to claim 1, wherein the request identifier is carried in an operation field with a value of 5 to indicate that the first request packet is used to request the IP address according to the MAC address.

3. The method according to claim 1, wherein the MAC address in the first Ethernet payload comprises multiple MAC addresses to indicate that IP addresses of multiple target electronic devices in the local area network are requested;
wherein the receiving, by the sender electronic device, the first reply packet comprises:
receiving, by the sender electronic device, one or more first reply packets returned by the gateway server in the local area network, the one or more first reply packets comprising at least one IP address of the multiple target electronic devices.

4. An apparatus comprising:
one or more processors, and
a non-transitory memory coupled to the one or more processors and configured to store computer program instructions that, when executed by the one or more processors, cause the apparatus to perform the following operations:
broadcasting a first request packet in a local area network, wherein the first request packet comprises a request identifier indicating that the first request packet is used to request an internet protocol (IP) address according to a media access control (MAC) address, a first proxy forwarding identifier indicating that a gateway server in the local area network needs to forward the first request packet as a proxy, a first Ethernet payload with a MAC address associated with a target electronic device in the local area network;
receiving a first reply packet returned by the gateway server in the local area network, wherein the first reply packet comprises a second proxy forwarding identifier indicating that the gateway server in the local area network needs to forward the first reply packet as a proxy and a second Ethernet payload with an IP address of the target electronic device;
obtaining the IP address of the target electronic device from the first reply packet;
broadcasting a second request packet for requesting IP addresses of all electronic devices in the local area network, wherein the second request packet comprises a second request identifier and a third Ethernet payload that includes a target Ethernet address field with a value of null to indicate the IP addresses of all electronic devices are requested;
receiving multiple second reply packets returned by multiple electronic devices in the local area network, the multiple second reply packets including IP addresses of the multiple electronic devices; and
refreshing an online status of at least one of the multiple electronic devices to online and an online status of an electronic device that does not reply with a second reply packet to offline, wherein the online status of the at least one of the multiple electronic devices being online indicates that the at least one of the multiple electronic devices is in a state in which a communication connection to the at least one of the multiple electronic devices can be established, the online status of the electronic device being offline indicates that the electronic device is in a state in which a communication connection to the electronic devices can't be established.

5. The apparatus according to claim 4, wherein the request identifier is carried in an operation field with a value of 5 to indicate that the first request packet is used to request the IP address according to the MAC address.

6. The apparatus according to claim 4, wherein the MAC address in the first Ethernet payload comprises multiple MAC addresses to indicate that IP addresses of multiple target electronic devices in the local area network are requested;

wherein the receiving the first reply packet comprises:

receiving one or more first reply packets returned by-the gateway server in the local area network, the one or more first reply packets comprising at least one IP address of the multiple target electronic devices.

\* \* \* \* \*